United States Patent
Sarkar et al.

(10) Patent No.: US 10,988,385 B2
(45) Date of Patent: Apr. 27, 2021

(54) NANOPARTICLE COMPOSITIONS AND METHODS OF MAKING AND USING THE SAME

(71) Applicant: SiNON THERAPEUTICS INC., Durham, NC (US)

(72) Inventors: Sabyasachi Sarkar, West Bengal (IN); Arsheen Allam, Raleigh, NC (US); Afreen Allam, Raleigh, NC (US); Abdul Allam, Raleigh, NC (US)

(73) Assignee: SiNON THERAPEUTICS INC., Durham, NC (US)

(*) Notice: Subject to any disclaimer, the term of this patent is extended or adjusted under 35 U.S.C. 154(b) by 515 days.

(21) Appl. No.: 15/278,232

(22) Filed: Sep. 28, 2016

(65) Prior Publication Data
US 2017/0088426 A1 Mar. 30, 2017

Related U.S. Application Data

(60) Provisional application No. 62/234,294, filed on Sep. 29, 2015, provisional application No. 62/234,252, filed on Sep. 29, 2015.

(51) Int. Cl.
*C01B 32/23* (2017.01)

(52) U.S. Cl.
CPC .......... *C01B 32/23* (2017.08); *C01P 2004/64* (2013.01)

(58) Field of Classification Search
CPC ............ C01B 31/0446; C01B 31/0484; C01B 31/0438; Y10S 977/774; B82Y 4/02; B82Y 4/04; B82Y 4/32
See application file for complete search history.

(56) References Cited

FOREIGN PATENT DOCUMENTS

| CN | 103922329 A | 7/2014 |
| WO | 2014179709 A1 | 11/2014 |
| WO | WO2014179708 | * 11/2014 |

OTHER PUBLICATIONS

Hummers WS, Offeman RE. Preparation of Graphitic Oxide. J Am Chem Soc 1958, 80: 1339-1339.
Boehm HP, Scholz W. Der „Verpuffungspunkt des Graphitoxids. Z Anorg Allg Chem 1965, 335: 74-79.
(Continued)

*Primary Examiner* — Paul A Wartalowicz
(74) *Attorney, Agent, or Firm* — Michael Best & Friedrich LLP

(57) ABSTRACT

Water soluble graphene oxide nanoparticles (GO) are provided having graphene sheets containing carboxylic and hydroxyl groups. The diameter of the GO when present in a closed form ranges from about 40 nm to 120 nm. Eco-friendly methods are provided for producing the GO. Methods for reversible encapsulation of a molecule within water soluble carbon nanoparticles (wsCNP) including the GO nanoparticles are provided that allow for delivery of the wsCNP loaded with therapeutic and/or imaging agents to a subject in need by releasing the therapeutic/imaging agent upon an increase in pH above about 7.2. The wsCNP have been shown to cross the blood brain barrier in a mouse model of vascular dementia, and methods are provided for delivering the wsCNP loaded with a therapeutic and/or imaging molecule to the brain.

9 Claims, 23 Drawing Sheets

(56) References Cited

OTHER PUBLICATIONS

Marcano DC, Kosynkin DV, Berlin JM, Sinitskii A, Sun Z, Slesarev A, et al. Improved Synthesis of Graphene Oxide. ACS Nano 2010, 4: 4806-4814.

Ye R, Xiang C, Lin J, Peng Z, Huang K, Yan Z, et al. Coal as an abundant source of graphene quantum dots. Nat Commun 2013, 4.

Ministry of Coal, Government of India, Coal Grades. 2014 Sep. 24, 2014 [cited 2015 Apr. 23, 2015] Available from: http://www.coal.nic.in/content/coal-grades.

Guerrero-Contreras J, Caballero-Briones F. Graphene oxide powders with different oxidation degree, prepared by synthesis variations of the Hummers method. Mater Chem Phys 2015, 153: 209-220.

Ethirajan M, Chen Y, Joshi P, Pandey RK. The role of porphyrin chemistry in tumor imaging and photodynamic therapy. Chem Soc Rev 2011, 40: 340-362.

Tsuda A, Nagamine Y, Watanabe R, Nagatani Y, Ishii N, Aida T. Spectroscopic visualization of sound-induced liquid vibrations using a supramolecular nanofibre. Nat Chem 2010, 2: 977-983.

Shen H, Zhang L, Liu M, Zhang Z. Biomedical Applications of Graphene. Theranostics 2012, 2: 283-294.

Heydorn WE. Donepezil (DZ): a new acetylcholinesterase inhibitor. Review of its pharmacology, pharmacokinetics, and utility in the treatment of Alzheimer's disease. Expert opinion on investigational drugs 1997, 6: 1527-1535.

Ye, Ruquan, et al., Coal as an abundant source of graphene quantum dots, Nature Communications, Dec. 6, 2013, pp. 1-7.

Xu, Chenggen, et al., Synthesis of graphene from asphaltene molecules adsorbed on vermiculite layers, SciVerse ScienceDirect, 2013, pp. 213-221, vol. 62.

EPO, European Search Report for European Patent Application No. 16 19 1327 dated Apr. 26, 2017.

EPO, Partial European Search Report for European Patent Application No. 16 19 1327 dated Apr. 26, 2017.

\* cited by examiner

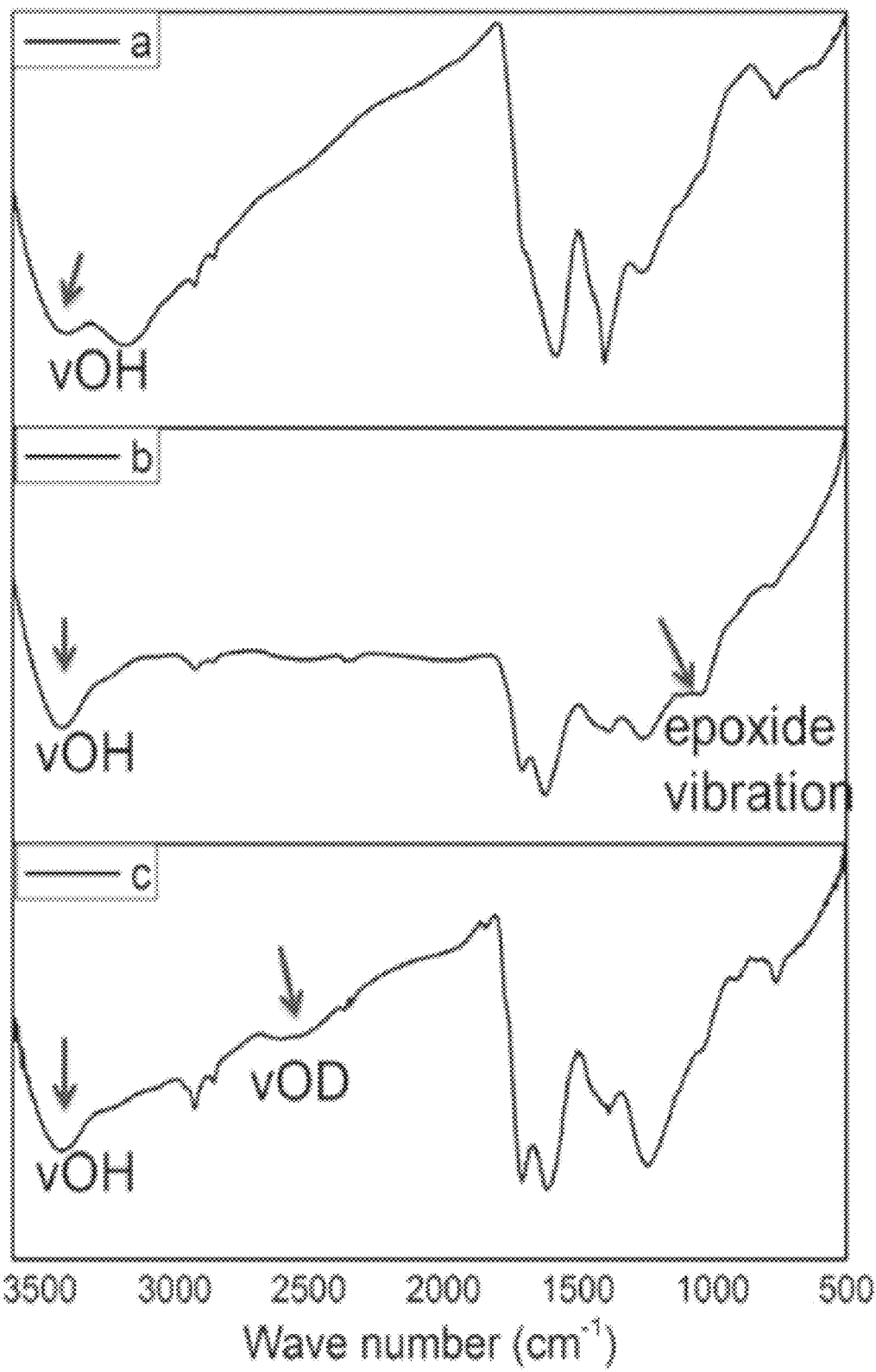

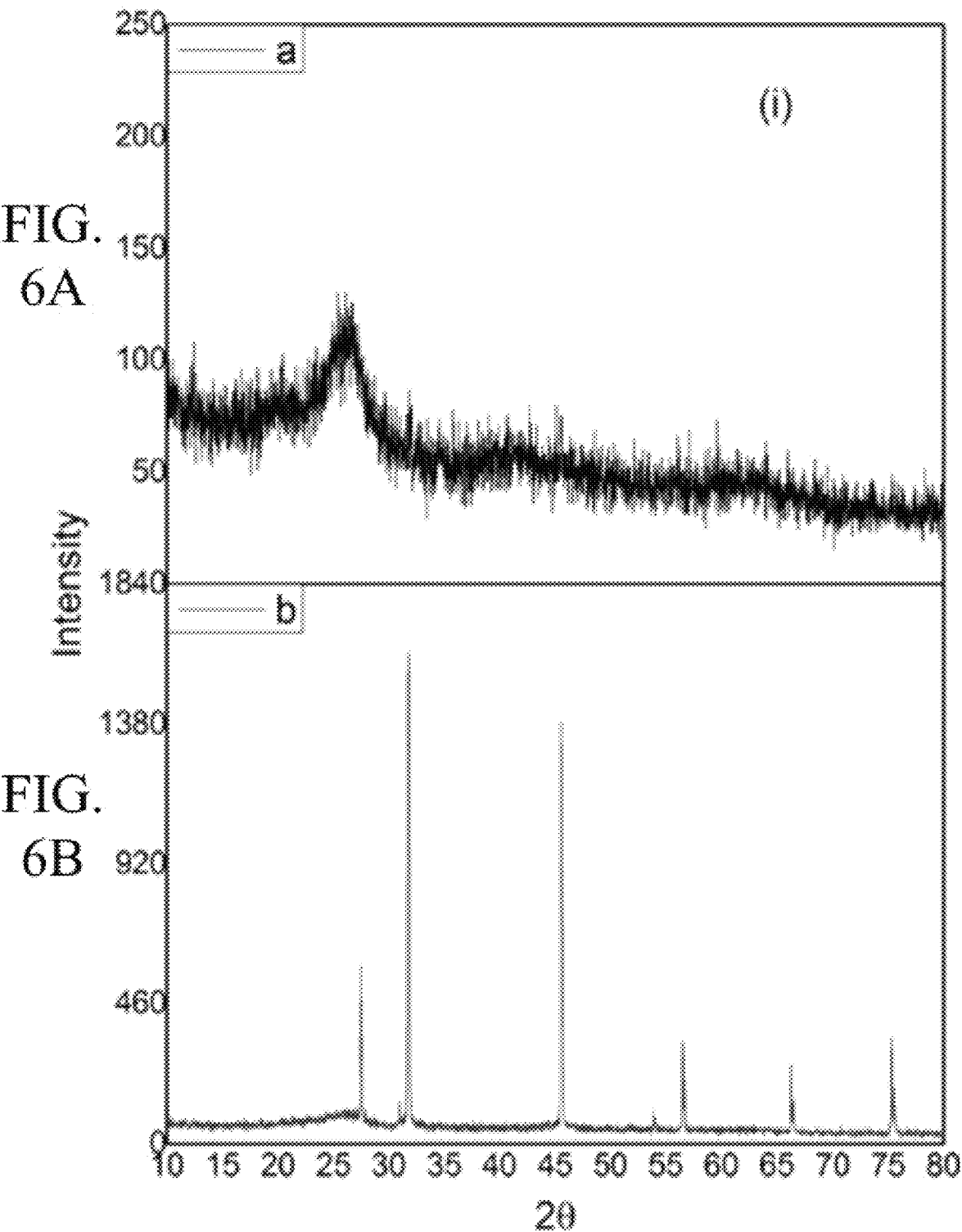

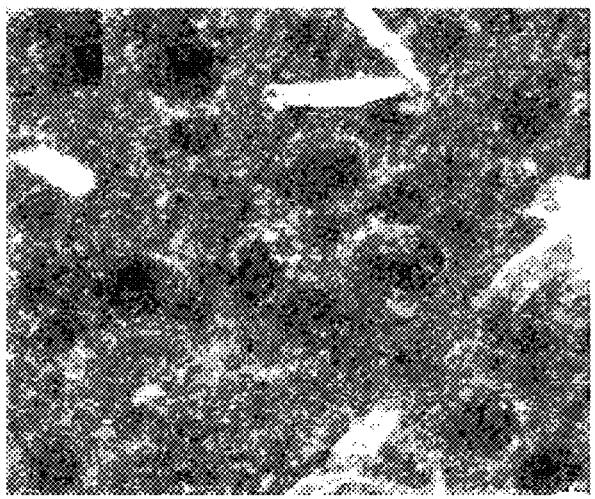
FIG. 12A — DAPI (blood vessels)
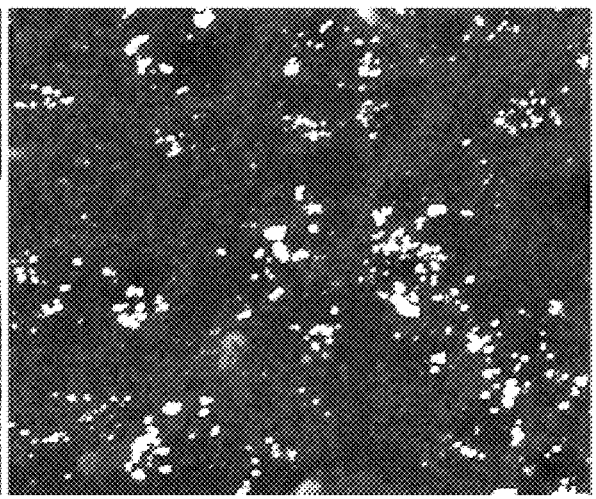
FIG. 12B — C or G
FIG. 12C — NeuN (neurons)
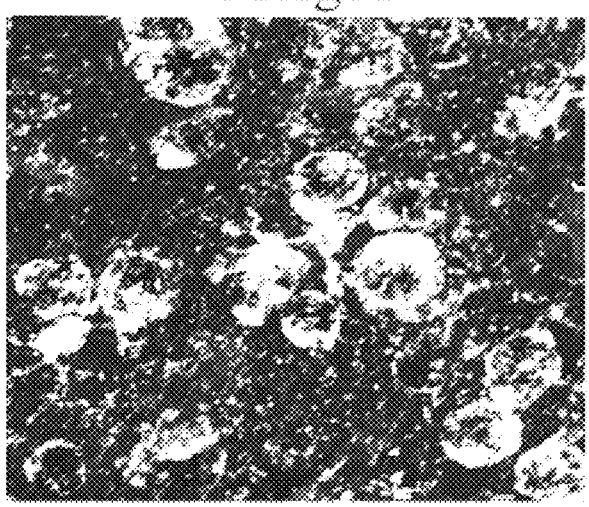
FIG. 12D — Merged

NANOPARTICLE COMPOSITIONS AND METHODS OF MAKING AND USING THE SAME

CROSS REFERENCE TO RELATED APPLICATIONS

This application claims the benefit of U.S. provisional patent application No. 62/234,294 and U.S. provisional patent application No. 62/234,252, both filed Sep. 29, 2015, the disclosures of which are hereby incorporated by reference in their entirety.

TECHNICAL FIELD

The presently disclosed subject matter relates to nanoparticle compositions and methods of making and using the disclosed compositions.

BACKGROUND

Synthesis of graphene oxide (GO) from graphite is dominated by the classic method introduced by Hummers[1], which comprises various oxidizing agents in corrosive oxidizing acid mixtures.[2,3] In a recent study, GO has been produced from anthracite coal by treating with concentrated nitric acid in the absence of oxidizing salt mixtures to achieve quantum graphene oxide.[4] The disclosed prior art methods produce graphene oxide by oxidative treatment of carbon. Further, the size of GO produced using prior art methods lies in two extremes (i.e., micrometer-sized particles when produced from graphite and less than 20 nm in size when produced from anthracite coal).

Nanoparticle-based compositions have been developed as vehicles for parenteral delivery of genes, proteins, and drugs that enter the brain by nasal insufflations (International Patent Application Publication No. WO 2013/040295). Particularly, the nanoparticles target the divalent metal transporter expressed on olfactory nerve terminals to transport divalent cation-coated or cation-containing nanoparticles to all regions of the brain. However, these nanoparticles suffer from the limitation of requiring pegylation for solubility.

Pericyte cells in a healthy brain play a crucial role in the functionality of the selective permeable space between the blood circulatory system and central nervous system (i.e., the blood-brain barrier ("BBB")). The BBB regulates brain homeostasis and includes sealed endothelial cells that line the blood vessels that selectively permit the entry of necessary molecules to pass into the brain through tight junctions and enzymatic carriers. The BBB is the greatest impediment preventing the use of diagnostic or therapeutic probes to be carried out by blood in combating neuronal disorders and/or to arrest the growth of tumors inside the brain. Particularly, pericyte cells create tight junctions that protect vesicle trafficking through the endothelial cells and inhibit the effects of CNS immune cells. In addition, pericytes act as contractile cells that assist in controlling and/or regulating flow within blood vessels and/or between blood vessels and the brain.

Moreover, the elasticity of pericyte cells allows expansion to reduce inflammation, thus allowing harmful substances to be diffused out of the brain. Pericyte dysfunction is associated with neurodegenerative diseases. Accordingly, pericytes are an important component of the neurovascular unit that contributes to the integrity of the BBB. CADASIL (Cerebral Autosomal Dominant Arteriopathy with Subcortical Infarcts and Leukoencephalopathy) is one of the most common small vessel diseases and is a major contributor of vascular dementia in humans. Primarily, CADASIL is believed to be caused by the Notch3 mutation. Recently, ultra-structural changes in pericytes have been shown in CADASIL. A murine model of CADASIL (R169C; Tg88 by overexpression of mutated transgene) is now available.

Thus, it would be beneficial to provide nanoparticle compositions of intermediate size, and methods of producing the nanoparticles. Further, it would be beneficial to provide non-toxic compositions capable of delivering therapeutic and imaging agents across the BBB.

SUMMARY

In some embodiments, the presently disclosed subject matter is directed to a method for making graphene oxide nanoparticles, the method comprising: (a) treating a material comprising one or a combination of wood charcoal, low grade coal, or carbonized plant biomass in a dilute alkali solution; and (b) separating the solution from the insoluble material and neutralizing the solution, wherein a precipitate that appears after neutralization of the solution comprises graphene oxide nanoparticles having a plurality of sheets ranging in size from about 40 nm to 200 nm in the open form. In some embodiments, the method further comprises washing the precipitate with cold water. In some embodiments, the method comprises one or more of the following: the dilute alkali solution is 10% sodium hydroxide solution; the treating in dilute alkali solution is performed at a temperature ranging from about 25° C. to 40° C. (such as about 40° C.); the treating with dilute alkali solution is performed until the solution turns a yellow-brown color; the wood charcoal, low grade coal or carbonized biomass is in a powdered form; wherein the wood charcoal, low grade coal or carbonized biomass is essentially free of aromatic hydrocarbons and other associated soluble organic compounds; and/or the mineral acid is hydrochloric acid.

In some embodiments, the presently disclosed subject matter is directed to a material comprising graphene oxide nanoparticles, the material produced by a process comprising: (a) treating a material comprising one or a combination of wood charcoal, low grade coal, or carbonized plant biomass in a dilute alkali solution; and (b) separating the solution from the insoluble material and neutralizing the solution, wherein a precipitate that appears after neutralization of the solution comprises graphene oxide nanoparticles having a plurality of sheets ranging in size from about 40 nm to 200 nm in the open form.

In some embodiments, the presently disclosed subject matter is directed to a material comprising graphene oxide nanoparticles (GO), wherein the GO comprises a plurality of graphene sheets, wherein a majority of the graphene sheets have a diameter when present in a closed form ranging from about 40 nm to 120 nm, and wherein the graphene sheets have a plurality of carboxylic and hydroxyl groups on the plurality of sheets. In some embodiments, the carboxylic groups comprise at least about 20% of the total weight of the GO; wherein the GO has a solubility in aqueous solution at a concentration of about 1 mg GO/ml; the GO displays fluorescence in the blue, green, red, and infra-red spectra; and/or the GO has amphiphilic properties.

In some embodiments, the presently disclosed subject matter is directed to a method for making graphene oxide nanoparticles, the method consisting essentially of treating a material comprising one or a combination of wood charcoal, low grade coal, or carbonized plant biomass in an alkali solution, wherein a precipitate that appears after neutralization of the solution comprises graphene oxide nanoparticles having a plurality of sheets ranging in size from about 40 nm to 200 nm in the open form. In some embodiments, the method further comprises washing the precipitate with cold water. In some embodiments, the method comprises one or more of the following: the alkali solution is 10% sodium hydroxide solution; the treating in alkali solution is performed at a temperature ranging from about 25° C. to 40° C. (such as about 40° C.); the treating with alkali solution is performed until the solution turns a yellow-brown color; the wood charcoal, low grade coal or carbonized biomass is in a powdered form; the wood charcoal, low grade coal or carbonized biomass is essentially free of aromatic hydrocarbons and other associated soluble organic compounds; and/or the neutralization is performed with hydrochloric acid.

In some embodiments, the presently disclosed subject matter is directed to a material comprising graphene oxide nanoparticles, the material produced by a process consisting essentially of treating a material comprising one or a combination of wood charcoal, low grade coal, or carbonized plant biomass in an alkali solution, wherein a precipitate that appears after neutralization of the solution comprises graphene oxide nanoparticles having a plurality of sheets ranging in size from about 40 nm to 200 nm in the open form.

In some embodiments, the presently disclosed subject matter is directed to a method for reversible encapsulation of a molecule within a water soluble carbon nanoparticle (wsCNP), the method comprising: contacting a wsCNP in an open form with a molecule to be encapsulated within the wsCNP in a solution, wherein the wsCNP has a plurality of graphene sheets comprising a plurality of carboxylic and hydroxyl groups on the graphene sheets, wherein the wsCNP has a closed form at a subsequent time and the encapsulated molecule can be released from the closed form wsCNP upon exposure of the wsCNP to a pH of about 7.2 or greater. In some embodiments, the method comprises one or more of the following: a majority of the graphene sheets when present in the closed form have a diameter ranging from about 2 nm to 120 nm; a majority of the graphene sheets when present in the closed form have a diameter ranging from about 40 nm to 120 nm; and/or the wsCNP is produced by a process comprising: (a) treating a material comprising one or a combination of wood charcoal, low grade coal, or carbonized plant biomass in a dilute alkali solution; and (b) separating the solution from the insoluble material and neutralizing the solution, wherein a precipitate that appears after neutralization of the solution comprises graphene oxide nanoparticles having a plurality of sheets ranging in size from about 40 nm to 200 nm in the open form.

In some embodiments, the presently disclosed subject matter is directed to a water soluble carbon nanoparticle (wsCNP) having a molecule encapsulated therein, the wsCNP comprising: a plurality of graphene sheets in a closed form at a pH of about 6.8 or less, wherein a molecule is encapsulated within the closed wsCNP, wherein a plurality of carboxylic and hydroxyl groups are present on the plurality of sheets, and wherein the molecule can be released from the closed form wsCNP at a pH of about 7.2 and higher. In some embodiments, a majority of the closed wsCNP have a diameter ranging from about 2 nm to 120 nm and/or a majority of the closed wsCNP have a diameter ranging from about 40 nm to 120 nm. In some embodiments, the wsCNP is produced by a process comprising: (a) treating a material comprising one or a combination of wood charcoal, low grade coal, or carbonized plant biomass in a dilute alkali solution; and (b) separating the solution from the insoluble material and neutralizing the solution, wherein a precipitate that appears after neutralization of the solution comprises graphene oxide nanoparticles having a plurality of sheets ranging in size from about 40 nm to 200 nm in the open form. In some embodiments, the molecule is an imaging agent; the molecule is a therapeutic agent; the molecule is a therapeutic agent for treatment of a brain disorder; the molecule is one or a combination of Donepezil, TPP, a protein, a peptide, a small molecule, a nucleic acid, a single strand DNA, a double strand DNA, an RNA, an siRNA, an oligonucleotide, a gene, a gene fragment, an imaging agent, or a lanthanide; and/or the molecule is a therapeutic agent for treatment of cancer. In some embodiments, the wsCNP further comprises one or more biomolecules or divalent metals to target delivery of the wsCNP with the encapsulated molecule to a cell, tissue, brain, or organ. In some embodiments, the biomolecule is a protein, a receptor, an aptamer, a ligand, or an antibody. In some embodiments, the divalent metal is manganese.

In some embodiments, the presently disclosed subject matter is directed to a method of delivering a molecule to a subject by delivering to the subject a composition comprising a water soluble carbon nanoparticle (wsCNP) having the molecule encapsulated therein, wherein the encapsulated molecule is released from the wsCNP into the subject as a result of the increase in pH after delivery to the subject's body. In some embodiments, the method comprises one or more of the following: delivering to the subject comprises intravenous injection of the subject with the composition comprising the wsCNP; delivering to the subject comprises inhalation of the composition comprising the wsCNP; the molecule is an imaging agent; the molecule is a therapeutic agent for treatment of a brain disorder; the brain disorder comprises dementia, vascular dementia, or Alzheimer's; the molecule is one or a combination of Donepezil, TPP, a protein, a peptide, a small molecule, a nucleic acid, a single strand DNA, a double strand DNA, an RNA, an siRNA, an oligonucleotide, a gene, a gene fragment, an imaging agent, or a lanthanide; the molecule is a therapeutic agent for treatment of cancer; and/or the molecule is for delivery in a subject across the blood brain barrier (BBB). In some embodiments, the wsCNP further comprises one or more biomolecules or divalent metals to target delivery of the wsCNP with the encapsulated molecule to a cell, tissue, brain, or organ of the subject. In some embodiments, the biomolecule is a protein, a receptor, an aptamer, a ligand, or an antibody. In some embodiments, the divalent metal is manganese.

BRIEF DESCRIPTION OF THE DRAWINGS

The previous summary and the following detailed descriptions are to be read in view of the drawings, which illustrate some (but not all) embodiments of the presently disclosed subject matter.

FIG. 3a is a Fourier Transform Infrared Spectroscopy (FT-IR) spectra of open fisted graphene oxide after treatment in $NH_4OH—H_2O$ and drying under vacuum at −37° C. in accordance with some embodiments of the presently disclosed subject matter.

FIG. 3b is a FTIR spectra for graphene oxide treated with dilute hydrochloric acid and evaporated under vacuum in accordance with some embodiments of the presently disclosed subject matter.

FIG. 3c is a FTIR spectra for graphene oxide treated with $ND_4OD$-$D_2O$ and dried under vacuum at −37° C. in accordance with some embodiments of the presently disclosed subject matter.

FIG. 6a is a powder X-ray diffraction (XRD) spectra of graphene oxide according to one or more embodiments of the presently disclosed subject matter.

FIG. 6b is an XRD spectrum of graphene oxide-TPP in accordance with some embodiments of the presently disclosed subject matter.

FIGS. 12A-12I are fluorescent microscope images for normal mice and for tumor-infected mice.

DETAILED DESCRIPTION

Figure 1A:
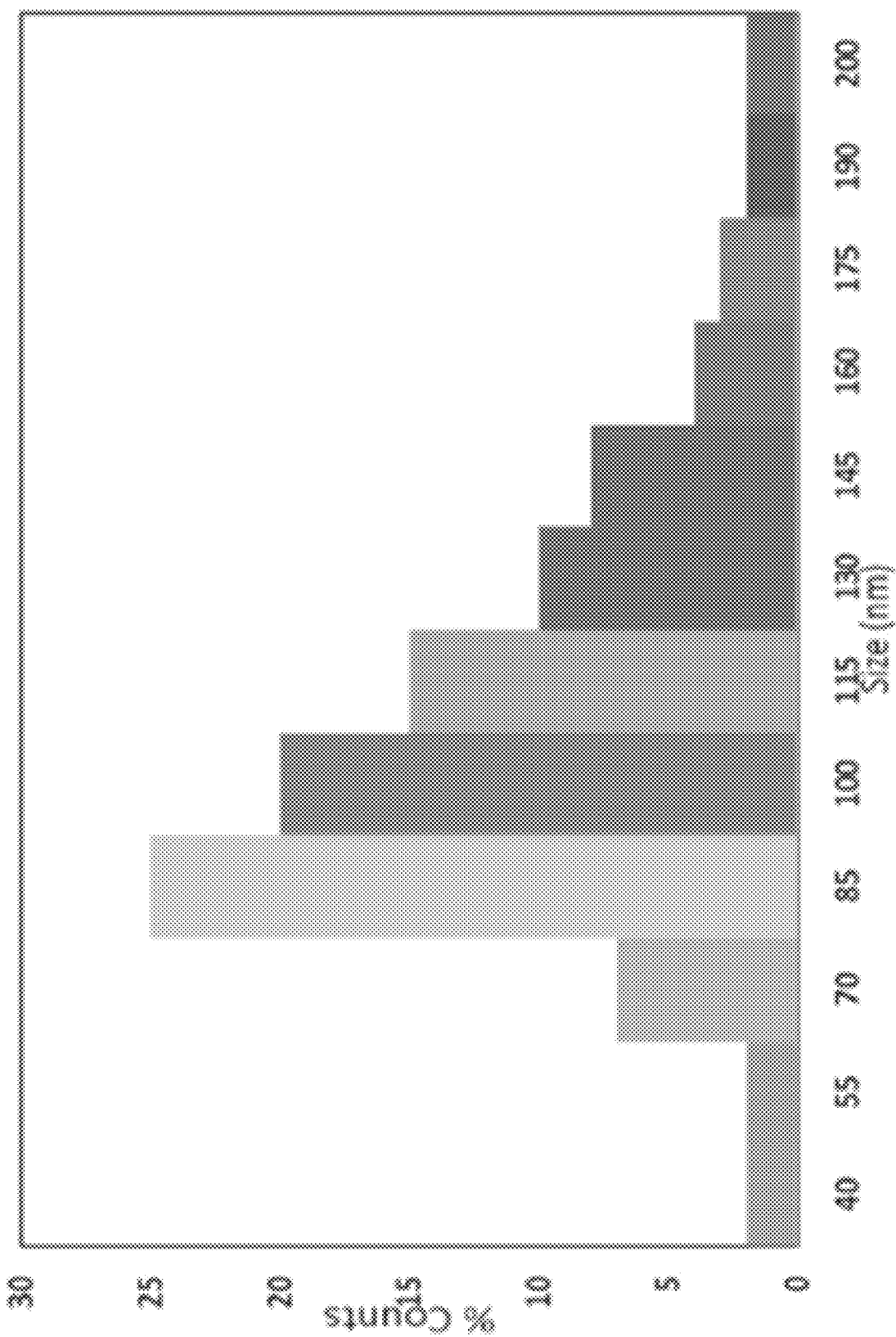
FIG. 1a is a bar graph illustrating the size distribution of graphene oxide by dynamic light scattering (DLS) in accordance with some embodiments of the presently disclosed subject matter.

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a nanoparticle" can include a plurality of such nanoparticles, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

In some embodiments, the presently disclosed subject matter provides a low toxicity water soluble carbon nanoparticles comprising a plurality of graphene sheets of diameter ranging from about 40 nm to 120 nm in the closed or spherical form. The uniquely sized graphene oxide nanoparticles are produced from wood charcoal, low grade coal, and/or carbonized plant biomass in an eco-friendly method. In some embodiments, the graphene oxide is also referred to herein as a water soluble carbon nanoparticle (wsCNP). The graphene oxide nanoparticles produced herein are significantly smaller than the micrometer-sized graphene oxide nanoparticles produced by prior art methods (e.g., Hummers, W. S. et al.[1]), but larger than the 20 nm-sized graphene quantum dot produced from anthracite coal (Ye., R. et al.[4]) and the water soluble graphene quantum dots (wsCdot) produced by a process described in U.S. Pat. No. 8,357,507 (where the diameter of the wsCdot is limited to about 2 nm to 20 nm). The graphene oxide nanoparticles provided herein comprise a diameter of about 40 nm to about 120 nm in the closed or spherical form, which is believed to be an ideal size for delivery of therapeutic agents and/or imaging agents to a subject.

As used herein the term "water soluble" refers to the physical property describing the ability of the disclosed wsCNP to dissolve in solvent water. While the disclosed graphene oxide nanoparticles and the wsCdots of the '507 patent are produced using different methods, both have a plurality of carboxylate groups on the graphene sheets that are believed to contribute to water solubility. Differing compositions dissolve at differing rates, but in general the dissolution rate of the wsCNP of the presently disclosed subject matter is at least 1 mg per ml of water. In addition, both the graphene oxide nanoparticles produced according to the method provided herein and the wsCdots of the '507 patent naturally fluoresce. "Fluorescing", as used herein, refers to the wsCNP self-capability to produce a luminescence upon release of energy after being exposed to a photon source of a given wavelength. Typically, fluorescence occurs at a different wavelength than the excitation wavelength of photons used to create the fluorescence.

It has been discovered that naturally pre-formed graphene oxide can be isolated from low grade coal, wood charcoal, and/or carbonized plant biomass by leaching the graphene oxide with dilute sodium hydroxide. In contrast to the method described in the '507 patent, strong acid is not required for preparation of the graphene oxide nanoparticles disclosed herein. "Low grade coal" refers to coal typically found in open pits, not deeply buried as required by higher grade coal (such as, for example, anthracite that requires completely anaerobic and high temperature conditions to extract graphene oxide[5]). In some embodiments, low grade coal includes non-coking coal and bituminous coal. Non-coking coal in general has a high ash and moisture content. For example, in some embodiments the low grade coal of the presently disclosed subject matter includes coal with heat value of between about 1300-4200 Kcal/kg, gross calorific value at 5% moisture of between about 3113-5089 Kcal/kg, and percentage ash plus moisture at 60% RH and 40° C. from about 34-55%.

As used herein, the term "carbonized plant biomass" refers to coal produced by the transformation of structured molecules of wood and cellulose products in plant biomass through the elimination of water and volatile substances. In some embodiments, carbonized plant biomass can include wood coal or vegetal coal.

In some embodiments, the presently disclosed subject matter provides water soluble carbon nanoparticles (wsCNP) having a plurality of graphene sheets of diameter ranging from about 2 nm to about 120 nm in closed form that can be loaded with a molecule (such as, but not limited to, a therapeutic agent or an imaging agent) for delivery to a subject.[9] In some embodiments, the disclosed wsCNPs have a lower toxicity than those produced from anthracite coal. The wsCNP are herein shown to change form based on changes in pH between an open form and a closed form that is spherical in shape. The structure change can be exploited to encapsulate a drug molecule within the spherical form such that the entrapped molecule is not released (even during sonication). As set forth herein below, a slight change in pH enables the closed form (spherical form) to open such that the molecule inside is released. The intracellular pH of around 6.8 and the extracellular pH of around 7.4 of mammalian cells coincides with the pH dependency of the structural change of the disclosed wsCNP. Thus, the disclosed wsCNP can be loaded with a molecule of interest (i.e., a therapeutic agent), the loaded wsCNP can be delivered to a subject, and the molecule of interest can be released within a subject for treatment.

In some embodiments, the presently disclosed subject matter is directed to a method of making graphene oxide. Particularly, the method comprises treating wood charcoal, low grade coal, and/or carbonized plant biomass with a dilute alkali solution. The method further comprises separating the alkali solution from the insoluble material and neutralizing the solution, wherein a precipitate that occurs after neutralization includes a plurality of graphene oxide nanoparticles having a plurality of sheets ranging in size from about 40 nm to 200 nm in the open form. In some embodiments, the method comprises separating the precipitate that appears after neutralization using centrifugation. In some embodiments, the yield of the precipitate containing the GO can range from about 8-12% based on the source material used. The GO produced by the disclosed method is freely soluble in alcohol and in water above neutral pH. In some embodiments, the GO produced by the disclosed method can be less soluble in the aqueous-acidic pH range.

In some embodiments, the wood charcoal, low grade coal, and/or carbonized plant biomass can be pulverized or otherwise ground into a finer particle or powdered form prior to treating in the dilute alkali solution. In some embodiments, the wood charcoal, low grade coal, and/or carbonized plant biomass can be freed from aromatic hydrocarbons and other associated soluble organic compounds by washing with an organic solvent (such as, but not limited to, toluene and/or acetone) prior to treatment in the dilute alkali solution. For example, thorough washing of carbonized plant biomass with acetone can be used to remove aromatic hydrocarbons prior to treating in the dilute alkali solution. In some embodiments, the wood charcoal, low grade coal, and/or carbonized plant biomass can be washed with dilute acid (i.e., hydrochloric acid) and/or water before and/or after washing with organic solvent. In some embodiments, the material can be dried (air dried, for example) prior to treating in the dilute alkali solution.

As used herein, the dilute alkali solution can include any water-soluble hydroxide or carbonate/bicarbonate (e.g., sodium or potassium hydroxide, sodium or potassium bicarbonate, and/or a solution of ammonia in water). In some embodiments, the dilute alkali solution can range in concentration from about 5% to about 30%, depending on the source of material used. In some embodiments, the dilute alkali solution can be a 10% sodium hydroxide solution.

In some embodiments, treatment in dilute alkali solution can be performed at a temperature ranging from about 25° C. to 40° C. However, it is to be understood that in some embodiments, the treatment can be performed at higher temperatures (such as, but not limited to, temperatures of up to about 80° C.) where the method for producing the graphene oxide nanoparticles can be completed in a lesser timeframe. In some embodiments, treating with dilute alkali solution can be performed at a temperature of about 40° C.

In some embodiments, treating with dilute alkali solution can be performed until the solution turns a yellow-brown color. In some embodiments, treating with dilute alkali solution can be performed until there is no longer significant observable additional leaching from the material. In some embodiments, the solution can be neutralized to a pH of about 7. In some embodiments, the solution can be neutralized with a mineral acid, such as (but not limited to) a dilute mineral acid. As used herein, "mineral acid" refers to any mineral acid including (but not limited to) hydrochloric acid, sulfuric acid, and/or nitric acid. In some embodiments, the precipitate that occurs after neutralization of the solution can appear slowly upon standing. The precipitate that occurs after neutralization of the solution includes graphene oxide nanoparticles having a plurality of sheets ranging in size from about 40 nm to 200 nm in the open form. In some embodiments, the method can include washing the precipitate with cold water.

In some embodiments, the presently disclosed subject matter is directed to a method of making graphene oxide nanoparticles, the method consisting essentially of treating a material including one or a combination of wood charcoal, low grade coal, or carbonized plant biomass in an alkali solution, wherein the precipitate that appears after neutralization of the solution comprises graphene oxide nanoparticles having a plurality of sheets ranging in size from about 40 nm to 200 nm in the open form. In some embodiments, the solution can be neutralized to a pH of about 7 (e.g., with a mineral acid such as hydrochloric acid). In some embodiments, the alkali solution can be 10% sodium hydroxide solution. In some embodiments, the treating in alkali solution can be performed at a temperature ranging from about 25° C. to 40° C., such as about 40° C. In some embodiments, the treating in alkali solution can be performed until the solution turns a yellow-brown color. In some embodiments, the wood charcoal, low grade coal and/or carbonized biomass can be in a powdered form. In some embodiments, the wood charcoal, low grade coal and/or carbonized biomass can be essentially free of aromatic hydrocarbons and other associated soluble organic compounds. In some embodiments, the method can include washing the precipitate with cold water.

As set forth below in Example 1 and in FIGS. 1-4, freshly prepared GO material produced from the disclosed method comprise a plurality of graphene sheets in an "open" form, where the majority of the sheets have a size ranging from about 40 nm to 200 nm, as observed by DLS, AFM, and SEM. In addition, the GO produced by the disclosed method is freely soluble in alcohol and in water above neutral pH, and is somewhat less soluble in the aqueous-acidic pH range. To this end, FIG. 1A illustrates a size distribution of GO determined using DLS. Upon aging overnight, in acidic pH (<=6.8), or after drying under vacuum, the structure of the GO was observed to change from oblique arches like a palm of a hand (i.e., the "open structure") to a clenched fist-like structure (i.e., the "closed structure") of a generally spherical shape. The closed structure was shown to revert back to the open form at pH of 7.4.

Figure 1B:
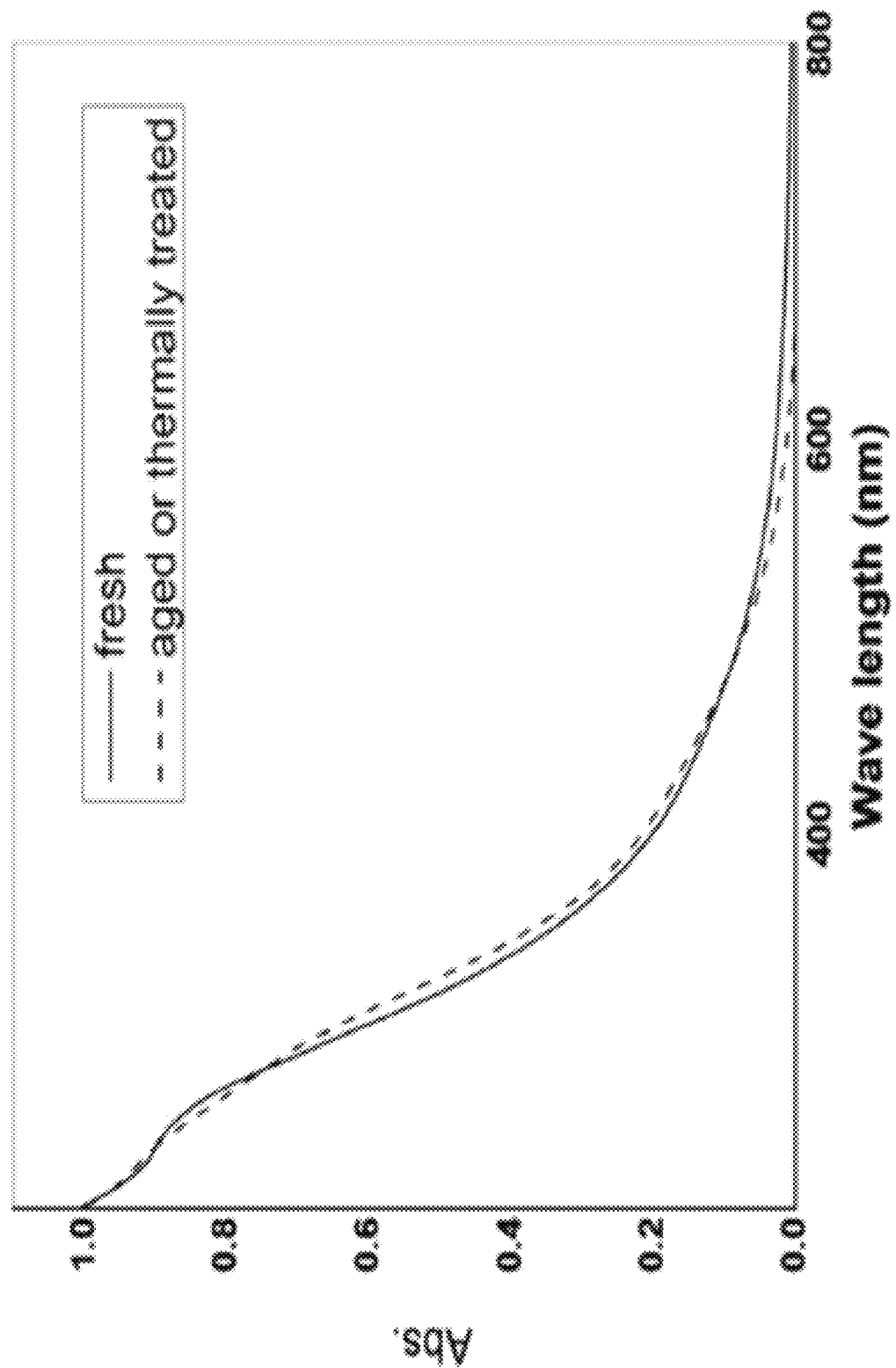
FIG. 1b is a graph of absorbance versus wavelength showing electronic spectra of graphene oxide (solid line for fresh, dotted line for aged or thermally treated) in accordance with some embodiments of the presently disclosed subject matter.
Figure 1C:
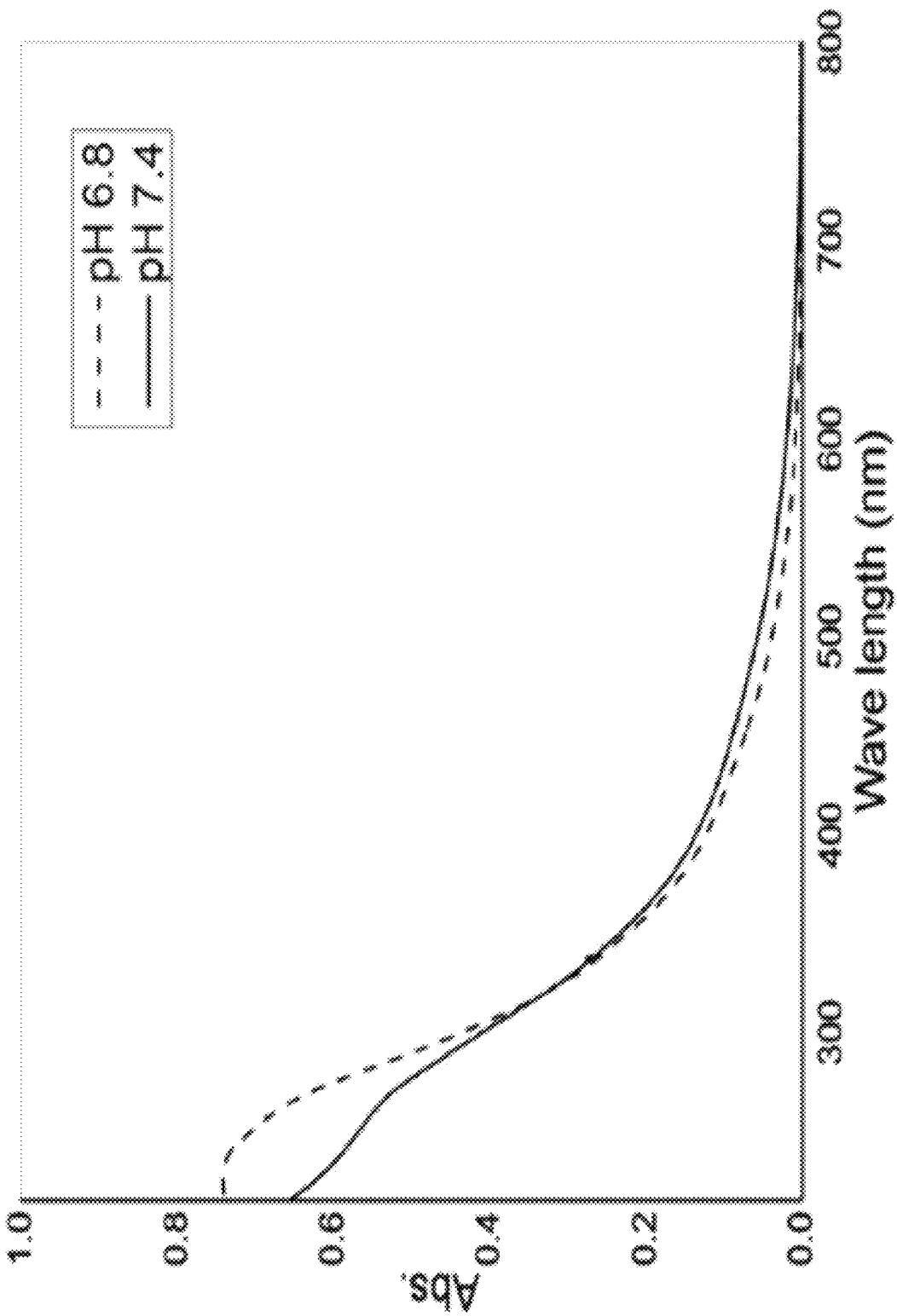
FIG. 1c is a graph of absorbance versus wavelength showing electronic spectra of graphene oxide in PBS buffer (solid line is pH 6.8 PBS buffer, dotted line is pH 7.4 PBS buffer) in accordance with some embodiments of the presently disclosed subject matter.

The change in structure of the GO was also observed in the electronic spectra shown in FIGS. 1B and 1C. Particularly, FIG. 1B is an electronic spectra of GO (solid line for freshly prepared GO; dotted line for aged GO). FIG. 1C is an electronic spectrum of the GO in PBS buffer pH 6.8 (solid line) and PBS buffer pH 7.4 (dotted line). At pH 6.8, the absorption at 260 nm shows a distinctive peak, but at pH 7.4 the contour of the peak appears as a shoulder. The changes to the absorption features are similar to those observed with the aged GO sample in alcohol. The spectra cross points when the GO is present at pH 6.8 versus when it is present at pH 7.4. The distinct change in the electronic spectra can be used as a marker to identify the two structural forms, namely the open (basic pH) and closed (spherical; acidic pH) forms.

The change in structure of the GO from an "open" type of form (freshly prepared GO and GO at a pH of about 7.2 and greater) to a "closed" type of form that is generally spherical in shape (GO after aging a few hours at room temperature, GO subjected to temperature change, GO after drying under a vacuum, including drying under a vacuum at −37° C., and GO at a pH of about 6.8 and less) is referred to herein for the purposes of the specification and claims in a number of different ways. Specifically, the "open" form GO can be referred to herein by any of the following terms: "open", "open form", "open fist", "open fisted", "oblique arch like a palm of a hand", "oblique arch", "oblique arch form", "open structure form", and "open structure". Similarly, the "closed" form GO can be referred to herein by any of the following terms: "closed", "closed form", "spherical", "spherical form", "generally spherical", "generally spherical shape", "closed fist", "closed fisted", "clenched fist", and "clenched fist form".

FIG. 2 shows a series of microscopic images (AFM, SEM, TEM and HRTEM) of open GO and closed GO, illustrating the open form of the fresh GO and the GO at basic pH and the closed or spherical form of the GO after aging and at acidic pH. Particularly, FIG. 2A is an Atomic Force Microscopy (AFM) image of open fisted GO; FIG. 2B is an AFM image of aged close fisted GO; FIG. 2C is a Scanning Electronic Microscopy (SEM) image of GO open fist form upon exposure with ammonia vapor; FIG. 2D is an SEM image of close fisted GO; FIG. 2E is a High Resolution Transmission Electron Microscopy (HRTEM) image of open fist GO; and FIG. 2F is an HRTEM image of closed fist GO.

Without being limited to any specific mechanism of action, the GO nanoparticles are believed to convert between the closed and open forms as a result of an epoxide-diol inter-conversion. Particularly, the closed GO is roughly spherical in form and can be expected to be thermodynamically more stable than the open fist form. It is believed that several adjacent phenolic hydroxyl groups on the surface of the GO participate in epoxide formation, resulting in the creation of an oblique arch (like a palm of a hand) that can close to a spherical form. The hypothesis was tested by the deuterolysis of the GO in 'closed fist' form. Specifically, the GO was treated with $ND_4OD$-$HD_2O$ and dried under vacuum at −37° C., as set forth in FIGS. 3A-3C that illustrate Fourier transform infrared spectroscopy (FT-IR) of the GO. FIG. 3A shows the FTIR spectra of the open fisted GO form after treatment in $NH_4OH$—$H_2O$ and drying under vacuum at −37° C. (due to the presence of the $NH_4OH$—$H_2O$, the GO remains in the open form after vacuum drying). FIG. 3B shows the FTIR spectra for GO treated with dilute hydrochloric acid and evaporated under vacuum. FIG. 3C shows the FTIR spectra of GO treated with $ND_4OD$-$D_2O$ and dried under vacuum at −37° C. The spectra in FIG. 3A shows an absence of epoxide vibration with the appearance of a common v(OH) vibration for diol merged with the v(OH) vibration from carboxylic acid group. FIG. 3C shows the appearance of v(OD) around 2600 cm$^{-1}$ and also shows the disappearance of a peak around 1000 cm$^{-1}$, responsible for the epoxide vibration (C—O—C).[6] When GO was treated with dilute hydrochloric acid and evaporated under vacuum, a (C—O—C) vibration around 1000 cm$^{-1}$ (FIG. 3B) was observed; the peak was not apparent in the spectra of FIG. 3A or 3C. In FIG. 3A, which is a spectrum of the GO when treated with $NH_4OH$—$H_2O$ and dried under vacuum at −37° C., an epoxide vibration was not observed, but there was a vOH at 3500 cm$^{-1}$, indicating an open fisted form of the GO under basic ($NH_4OH$—$H_2O$) conditions. FIG. 3B shows an epoxide vibration (C—O—C) around 1000 cm$^{-1}$ and the presence of vOH at 3500 cm$^{-1}$. In FIG. 3C, the GO was treated with $ND_4OD$-$D_2O$ and dried under vacuum at −37° C., and the spectra confirms the epoxide-diol inter-conversion (presence of epoxide vibration) and shows appearance of vOD around 2600 cm$^{-1}$ and disappearance of a peak around 1000 cm$^{-1}$. Accordingly, it can be confirmed that the open fist form of GO is present in the $ND_4OD$-$D_2O$. Further, the addition of $ND_4OD$-$D_2O$ opens the GO closed fist form, which is shown in the FTIR spectra of FIG. 3C.

Figure 4A:
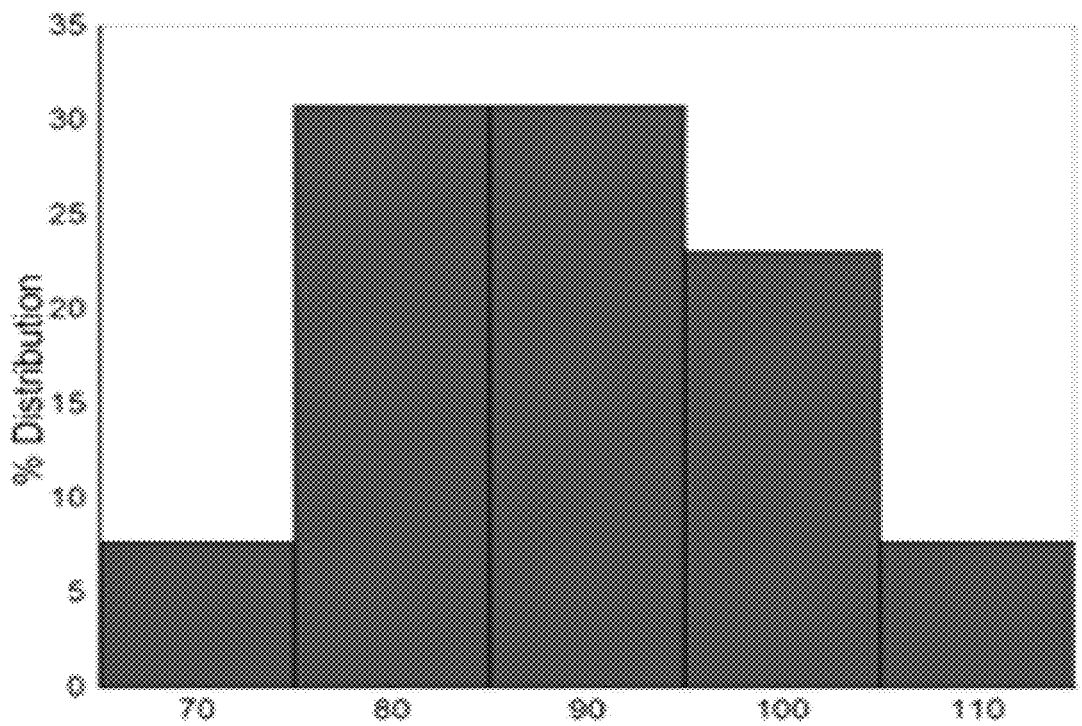
FIGS. 4a and 4b are bar graphs illustrating the size distribution from AFM image analysis of graphene oxide nanoparticles produced according to some embodiments of the presently disclosed subject matter in the open fist structure (FIG. 4a) and in the closed fist, spherical structure (FIG. 4b).

Without desiring to be limited to any particular mechanism of action, it is believed that the π-π stacking in the honeycomb hexagon structure of carbon in graphene is counteracted with the introduction of several oxo-functional groups on the surface of GO. The larger surface graphene oxide area of the GO resulting from the disclosed method (as compared to, for example, the wsCdots of the '507 patent where the size is limited to within 20 nm) would be expected to respond to energy savings and result in a stable clenched fist (spherical) form. A size range of 40 nm to 200 nm with maximum distribution in the range of about 60-140 nm was determined for the open form of the GO using DLS analysis (FIG. 1A). The size of the open form of the GO was also measured by AFM (FIG. 4A). These data were used to calculate the expected size of the closed GO sphere structure formed by either two open fist graphene sheets (two superficial halves) combining at the edges to form a spherical shape or by closure of a single graphene sheet. The results are shown in Table 1 below. The AFM data are shown in the histogram size distribution graphs of FIG. 4A (size distribution of GO in the open fist structure) and FIG. 4B (size distribution of GO in the closed fist, spherical structure). The range of size distribution observed for the open and closed fist forms of GO using AFM indicates the possibility of either a single sheet closure or closure of two or more sheets and the closed spherical form is energetically favored.

TABLE 1

Calculation of Size Distribution of Closed Form GO

| Open GO | | | Number of Units Required to Form Closed GO (Spherical) | |
|---|---|---|---|---|
| | | | 1 | 2 |
| Length (nm) | Breadth (nm) | Area (nm$^2$) | Size of Closed GO (diameter in nm) | |
| 151.741 | 96.599 | 14658.03 | 70 | 100 |
| 131.06 | 79.598 | 10432.11 | 60 | 80 |
| 151.702 | 93.153 | 14131.5 | 70 | 100 |
| 182.764 | 110.328 | 20163.99 | 80 | 120 |
| 144.847 | 100.223 | 14517 | 70 | 100 |
| 151.741 | 103.433 | 15695.03 | 70 | 100 |
| 172.423 | 113.776 | 19617.6 | 80 | 110 |
| 106.881 | 93.153 | 9956.286 | 55 | 80 |
| 151.702 | 93.09 | 14121.94 | 70 | 100 |
| 120.672 | 89.708 | 10825.24 | 60 | 80 |
| 144.847 | 106.936 | 15489.36 | 70 | 100 |
| 104.348 | 82.746 | 8634.38 | 50 | 70 |
| 77.785 | 72.403 | 5631.867 | 40 | 60 |

In some embodiments, a material is provided having graphene oxide nanoparticles (GO) produced by the method disclosed herein. Particularly, the method comprises treating a material including one or a combination of wood charcoal, low grade coal, or carbonized plant biomass in a dilute alkali solution. The method further comprises separating the solution from the insoluble material and neutralizing the solution, wherein a precipitate that appears after neutralization of the solution comprises graphene oxide nanoparticles having a plurality of sheets ranging in size from about 40 nm to 200 nm in the open form. In some embodiments, the solution can be neutralized (i.e., using a mineral acid such as hydrochloric acid) at a pH of about 7. In some embodiments, the dilute alkali solution can be a 10% sodium hydroxide solution. In some embodiments, treating in dilute alkali solution can be performed at a temperature of about 25° C. to 40° C., such as about 40° C. In some embodiments, treating with dilute basic solution can be performed until the solution turns a yellow-brown color. In some embodiments, the wood charcoal, low grade coal or carbonized biomass can be in a powdered form. In some embodiments, the wood charcoal, low grade coal or carbonized biomass can be essentially free of aromatic hydrocarbons and other associated soluble organic compounds.

In some embodiments, a material is provided comprising graphene oxide nanoparticles (GO), wherein the material is produced using a method consisting essentially of treating the material (including one or a combination of wood charcoal, low grade coal, or carbonized plant biomass) in an alkali solution. A precipitate that appears after neutralization of the solution comprises graphene oxide nanoparticles having a plurality of sheets ranging in size from about 40 nm to 200 nm in the open form. In some embodiments, the solution can be neutralized at a pH of about 7, such as by using a mineral acid (e.g., hydrochloric acid) at a pH of about 7. In some embodiments, the alkali solution can be 10% sodium hydroxide solution. In some embodiments, the treating in alkali solution can be performed at a temperature of about 25° C. to 40° C., such about 40° C. In some embodiments, the treating in alkali solution can be performed until the solution turns a yellow-brown color. In some embodiments, the wood charcoal, low grade coal or carbonized biomass can be in a powdered form. In some embodiments, the wood charcoal, low grade coal or carbonized biomass can be essentially free of aromatic hydrocarbons and other associated soluble organic compounds.

In some embodiments, a material is provided including graphene oxide nanoparticles (GO), wherein the GO includes a plurality of graphene sheets, wherein a majority of the graphene sheets have a diameter when present in a closed form ranging from about 40 nm to 120 nm, and wherein the graphene sheets have a plurality of carboxylic and hydroxyl groups on the plurality of sheets. In some embodiments, the carboxylic groups comprise at least about 20% of the total weight of the GO. In some embodiments, the GO can demonstrate solubility in aqueous solution at a concentration of about 1 mg GO/ml. In some embodiments, the GO can display fluorescence in the blue, green, red, and infra-red spectra. In some embodiments, the GO can have amphiphilic properties.

Based on the observation of the reversible structural change between the open and closed forms of the GO resulting from pH change, the ability of the GO to load and release a molecule (such as a therapeutic molecule) was investigated. For these studies, the molecules tetraphenyporphyrin (TPP) and donepezil were selected. Both TPP and donepezil are spectrally identifiable molecules, and TPP is considered to be a large therapeutic molecule. In addition, TPP is considered a model for several porphyrins in photodynamic therapy.[7] Donepezil is an acetylcholinesterase inhibitor commonly used for the treatment of Alzheimer's disease.

Encapsulation of each molecule within the GO was performed as described below in Example 2. Particularly, the method for encapsulation includes contacting a GO in an open form (such as, for example, a freshly prepared GO or a GO at a pH of about 7.2 or greater) with a molecule to be encapsulated in an aqueous or alcoholic solution. The GO can be evaporated to dryness under vacuum at –37° C., can be left to age, or can be placed at a pH of about 6.8 or lower, resulting in the structural change to the closed form and encapsulation of the molecule. The GO comprising the encapsulated molecule is referred to herein as a GO composite such as, for example, a "GO-TPP" composite or a "GO-donepezil" composite. In some embodiments, the GO composite can be washed with, for example, water, a dilute acidic solution, or alcohol. In some embodiments, the GO composite can be further extracted with alcohol and evaporated to dryness under vacuum at –37° C.

The GO-TPP and GO-donepezil composites produced as described in Example 2 were subjected to various spectroscopic and microscopic investigations and the results are shown in FIGS. 5 and 6. Both TPP and donepezil are insoluble in water. FIG. 5A is an HRTEM image of the GO-TTP composite after treatment with $NH_3$ to increase the pH, which shows the GO in the open form. FIG. 5B is an HRTEM image of the GO-TPP, showing the GO in the closed form. The inset of FIG. 5B is an enlarged section of the composite that shows the presence of stacked TPP within the GO. FIG. 5Cc is an SEM image of a GO-TPP composite after treatment with $NH_3$ to increase the pH, and shows the GO in the open form. FIG. 5D is an SEM image of a GO-TPP composite, and shows the GO in the closed form. FIG. 5E is an electronic spectra of a GO-TPP composite in PBS buffer pH 7.4, showing the open form of the GO that allows for release of TPP (inset: electronic spectrum of dichloromethane extract of the GO-TPP buffer showing the features of TPP). FIG. 5F is an electronic spectra of the GO-TPP in PBS buffer at pH 6.8, showing features of the encapsulated TPP within the closed form (TPP was not detected after dichloromethane extraction of the GO-TPP buffer). FIG. 5G is an electronic spectra of the GO-donepezil composite in PBS buffer pH 7.4, showing the open form of GO allows for release of the donepezil (inset: electronic spectrum of dichloromethane extract of the GO-donepezil buffer showing the features of donepezil). FIG. 5H is an electronic spectra of the GO-donepezil composite in PBS buffer pH 6.8, showing features of the encapsulated donepezil within the closed form of the GO (donepezil was not detected after dichloromethane extraction of the GO-donepezil buffer).

Figure 6C:
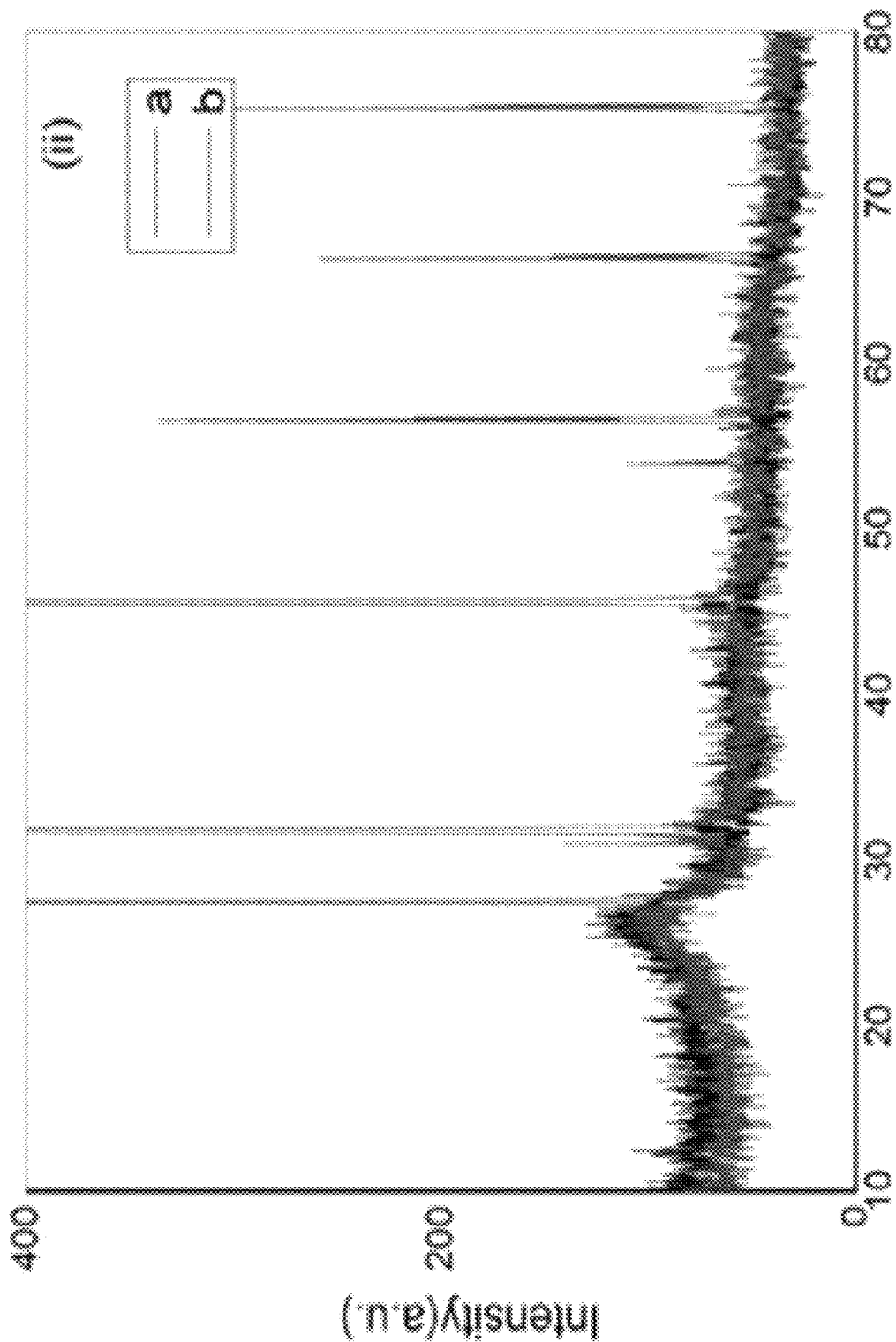
FIG. 6c is an enlarged view of the spectrum from FIG. 6b, illustrating the presence of both the broad peaks from the graphene oxide and the sharp peaks from the TPP.

Powder X-ray diffraction (XRD) was performed on the GO-TPP, as shown in FIGS. 6A-6C. Particularly, FIG. 6A is an XRD spectrum of GO without encapsulated TPP. FIG. 6B is an XRD spectrum of GO-TPP composite, showing sharp peaks for TTP and the broad peaks of the GO. FIG. 6C is an enlarged view of the spectrum from FIG. 6B to more clearly illustrate the presence of both the broad peaks from the GO and the sharp peaks from the TPP.

Figure 7A:
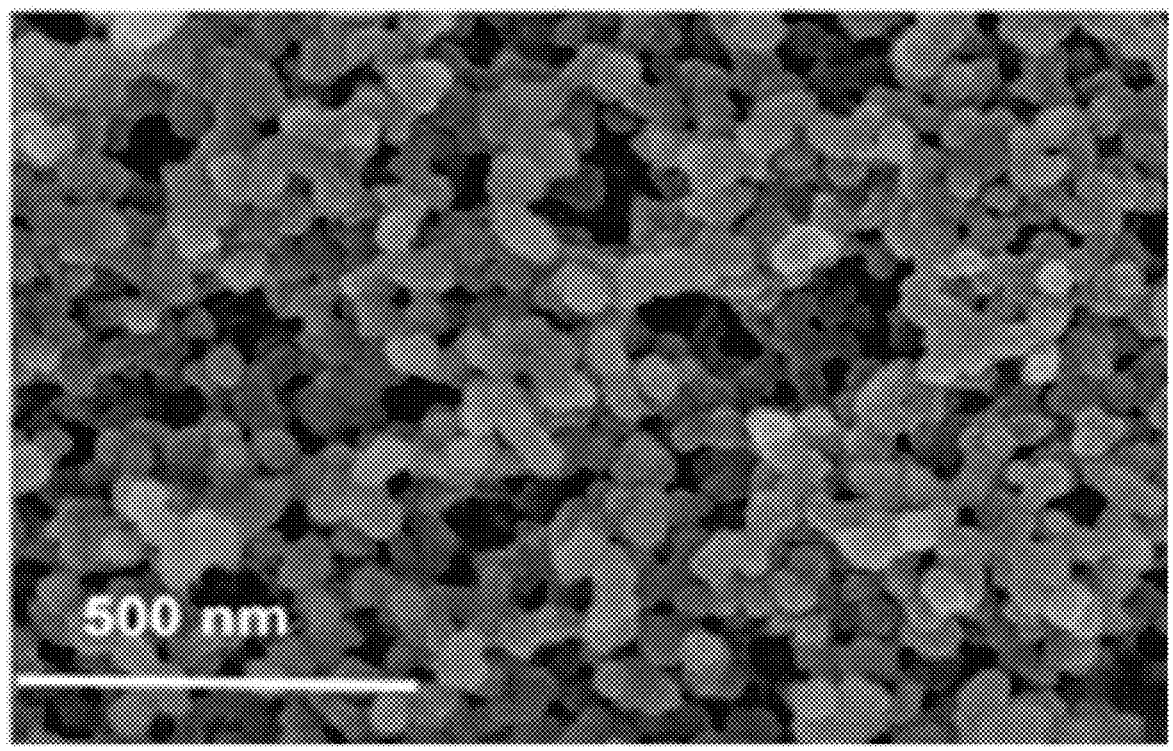
FIG. 7a is an SEM image of freshly prepared water soluble quantum carbon dots (wsCdot) according to some embodiments of the presently disclosed subject matter.
Figure 7B:
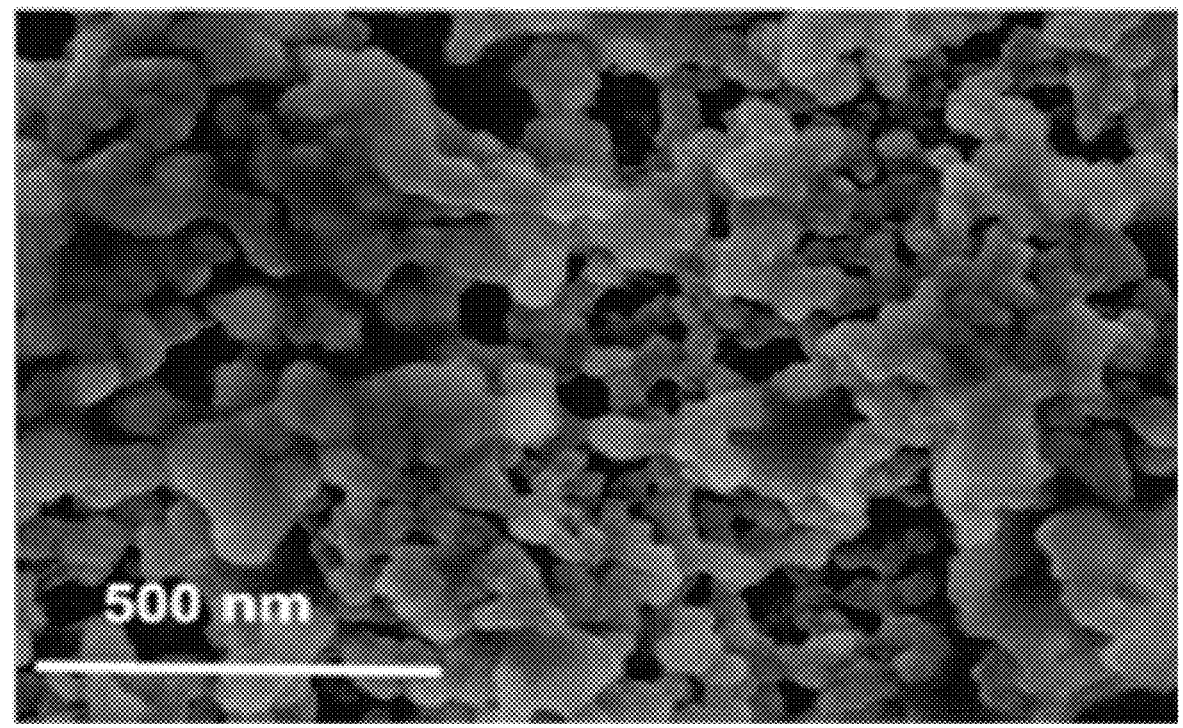
FIG. 7b is an SEM image of freshly prepared wsCdot after exposure to $NH_3$ vapour in accordance with some embodiments of the presently disclosed subject matter.
Figure 7C:
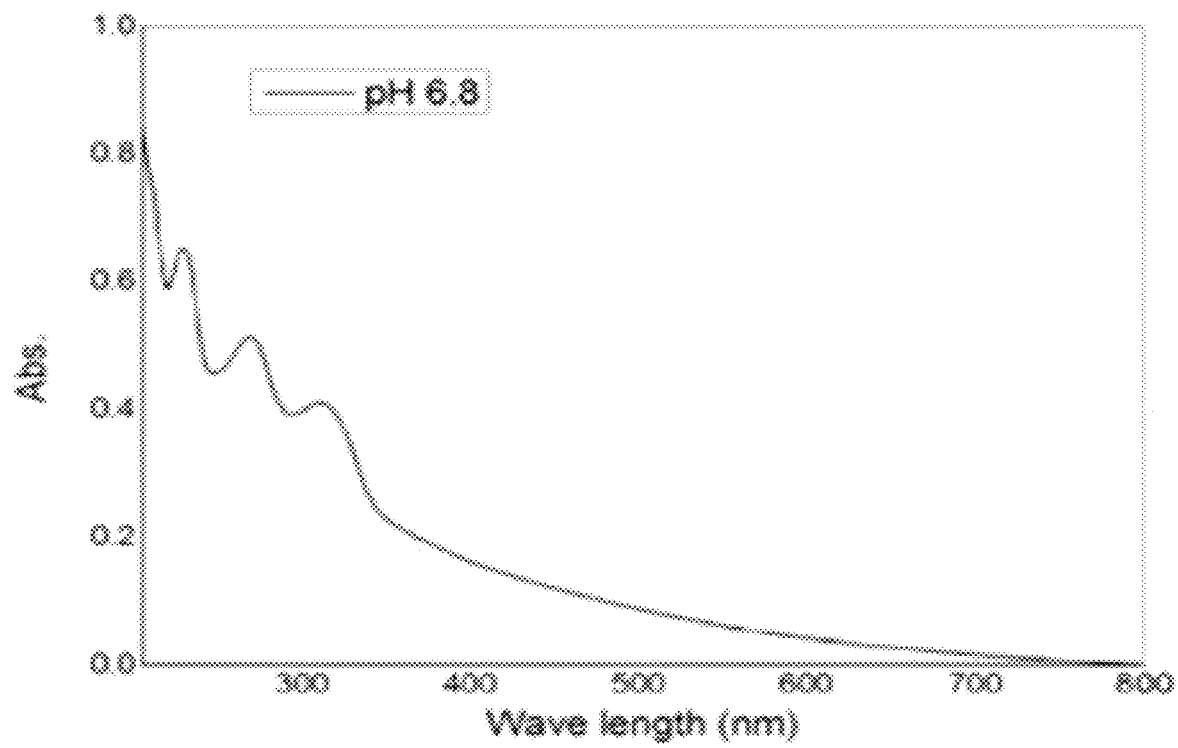
FIG. 7c is an electronic spectrum of wsCdot-donepezil composite in PBS, pH 6.8, where extraction with DCM did not remove the donepezil from the composite in accordance with some embodiments of the presently disclosed subject matter.
Figure 7D:
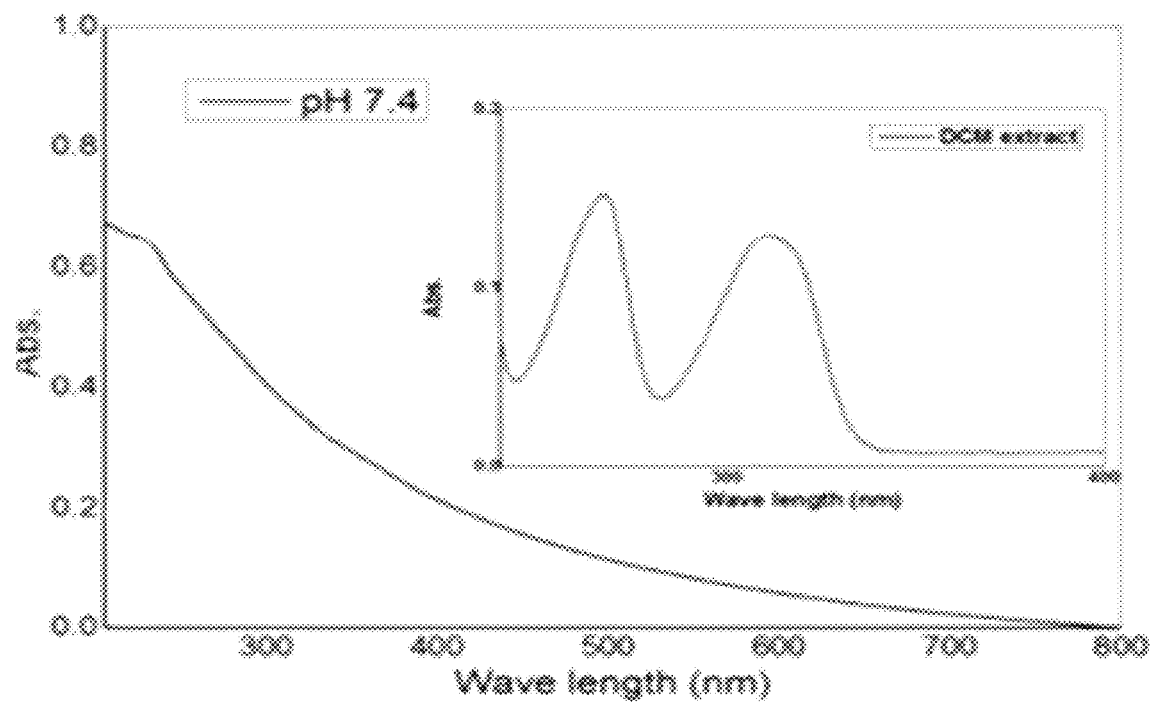
FIG. 7d is an electronic spectrum of wsCdot-donepezil composite in PBS, pH 7.4 in accordance with some embodiments of the presently disclosed subject matter, where extraction with DCM revealed a signature donepezil spectrum that is shown in the inset.

In addition to encapsulation of the GO with a molecule, the encapsulation method disclosed herein can also be used with other graphene-based water soluble carbon nanoparticles (wsCNPs). For example, the water soluble quantum carbon dots (wsCdot) described in the '507 patent (herein incorporated by reference in its entirety) were used to encapsulate donepezil, as described in Example 2 and shown in FIG. 7. The wsCdots described in the '507 patent have a size range of about 2-20 nm in diameter. As set forth in Example 2, the wsCdot was prepared according to the methods described in the '507 patent and investigated using microscopic and electronic spectral measurements as described herein above for the GO. FIG. 7B is an SEM image of aged wsCdot. FIG. 7B is an SEM image of aged wsCdot after exposure to $NH_3$ vapour, showing a change from a spherical structure to an open structure after the $NH_3$ treatment. FIGS. 7C and 7D are electronic spectra of a wsCdot-donepezil composite prepared according to the encapsulation method of the present disclosure. FIG. 7C shows electronic spectra of the wsCdot-donepezil composite in PBS, pH 6.8, where extraction with DCM did not remove the donepezil from the composite. FIG. 7D shows electronic spectra of the wsCdot-donepezil composite in PBS, pH 7.4, where extraction with DCM revealed a signature donepezil spectrum which is shown in the inset. Accordingly, the encapsulation methods of the present disclosure are useful with wsCNP having a plurality of graphene sheets, wherein the graphene sheets have a plurality of carboxylic and hydroxyl groups.

In some embodiments, the presently disclosed subject matter is directed to a method reversible encapsulation of a molecule within a water soluble carbon nanoparticle (wsCNP). Particularly, the method comprises contacting a wsCNP in an open form with a molecule to be encapsulated within the wsCNP in a solution. The wsCNP comprises a plurality of graphene sheets that include a plurality of carboxylic and hydroxyl groups. The wsCNP has a closed form at a subsequent time such that the encapsulated molecule can be released from the closed form wsCNP upon exposure to a pH of about 7.2 or greater. In some embodiments, the carboxylic groups can comprise at least about 20% of the total weight of the wsCNP. In some embodiments, the solution can be an aqueous or alcoholic solution.

The open form of wsCNP refers to freshly prepared wsCNP, wsCNP at a pH of about 7.2 or greater, and wsCNP in the open form as characterized herein by microscopic and electronic analysis. As used herein, the phrase "wherein the wsCNP has a closed form at a subsequent time" refers to the data set forth in the presently disclosed subject matter that illustrates that aging at room temperature can result in the wsCNP changing from an open form to a closed form, that subjecting a wsCNP to a temperature change can result in changing from an open form to a closed form, drying a wsCNP under a vacuum (including drying under a vacuum at −37° C.) can result in the wsCNP changing from an open form to a closed form, and/or placing a wsCNP at a pH of about 6.8 or less can result in the wsCNP changing from an open form to a closed form. In some embodiments, the phrase "wherein the wsCNP has a closed form at a subsequent time" refers to any method that causes or allows for a wsCNP to change structure to a closed form as characterized herein by microscopic and electronic analysis.

The presently disclosed method of reversible encapsulation can further include removing a majority of the molecule that is not encapsulated within the closed form wsCNP. Specifically, removing a majority of the molecule that is not encapsulated within the closed form wsCNP can include washing the wsCNP with water, a dilute acid, an alcohol, and/or a solvent. In some embodiments, the method can include drying the wsCNP and/or extracting the wsCNP with an alcohol.

In some embodiments of the presently disclosed method of reversible encapsulation, a majority of the graphene sheets present in the closed form can have a diameter ranging from about 2 nm to 120 nm. In some embodiments, a majority of the graphene sheets present in the closed form can have a diameter ranging from about 40 nm to 120 nm.

In some embodiments of the presently disclosed method of reversible encapsulation, the wsCNP can be produced by a process comprising treating a material comprising one or a combination of wood charcoal, low grade coal, and/or carbonized plant biomass in a dilute alkali solution; and separating the solution from the insoluble material and neutralizing the solution, wherein a precipitate that appears after neutralization of the solution comprises graphene oxide nanoparticles having a plurality of sheets ranging in size from about 40 nm to 200 nm in the open form.

In some embodiments of the presently disclosed method of reversible encapsulation, the wsCNP can be produced by a process consisting essentially of treating a material including one or a combination of wood charcoal, low grade coal, and/or carbonized plant biomass in an alkali solution, wherein a precipitate that appears after neutralization of the solution comprises graphene oxide nanoparticles having a plurality of sheets ranging in size from about 40 nm to 200 nm in the open form.

Figure 8A:
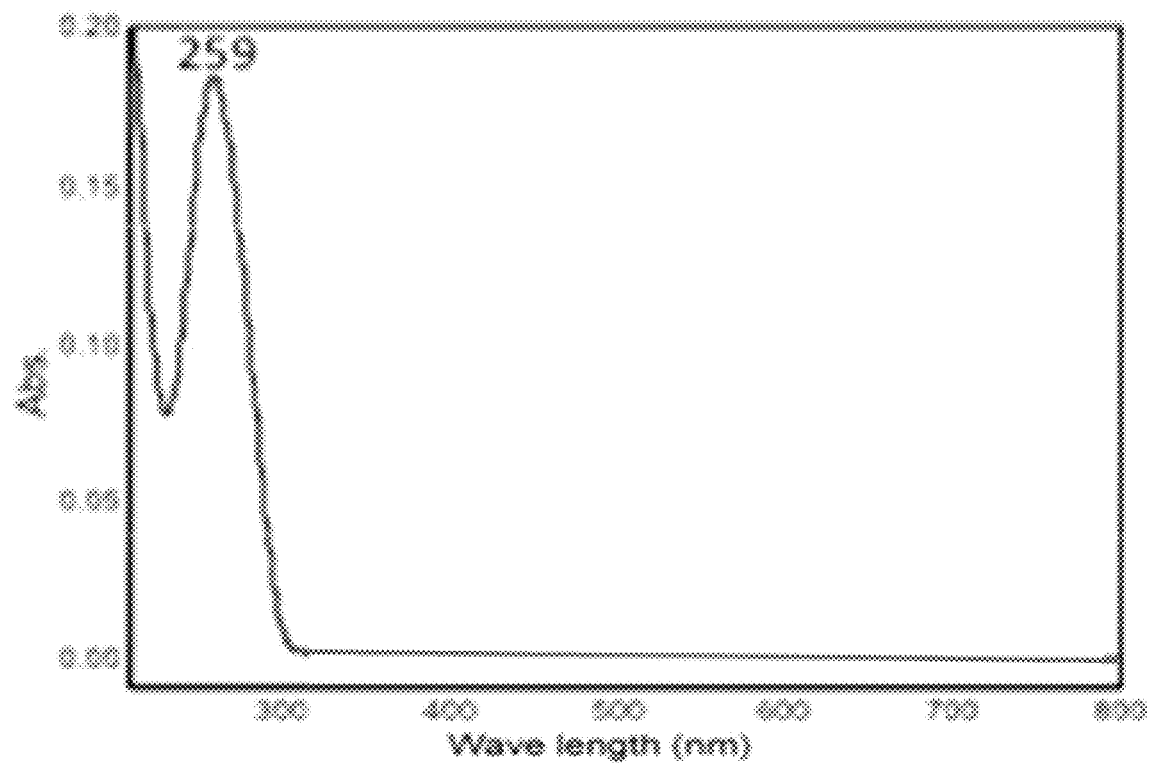
FIG. 8a is an electronic spectra of DNA alone showing a peak at 259 nm in accordance with some embodiments of the presently disclosed subject matter.
Figure 8B:
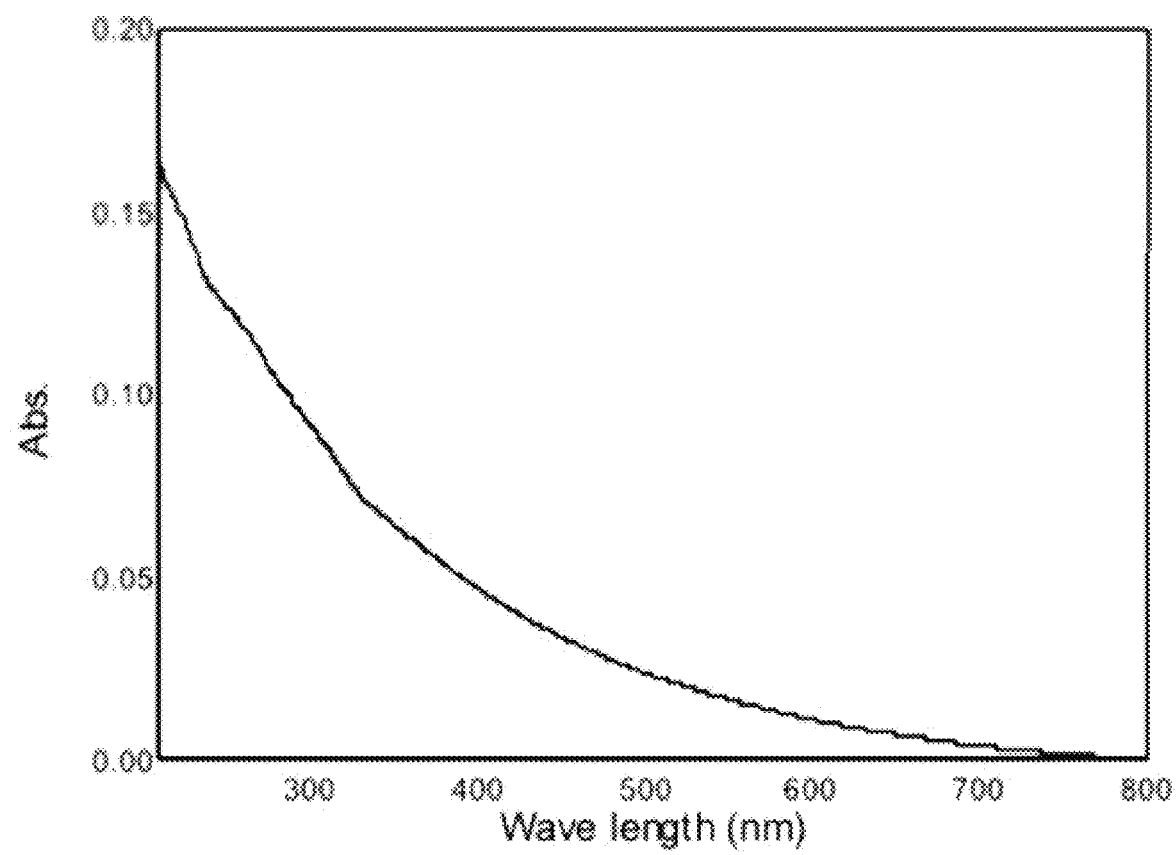
FIG. 8b is an electronic spectra of graphene oxide alone in accordance with some embodiments of the presently disclosed subject matter.
Figure 8C:
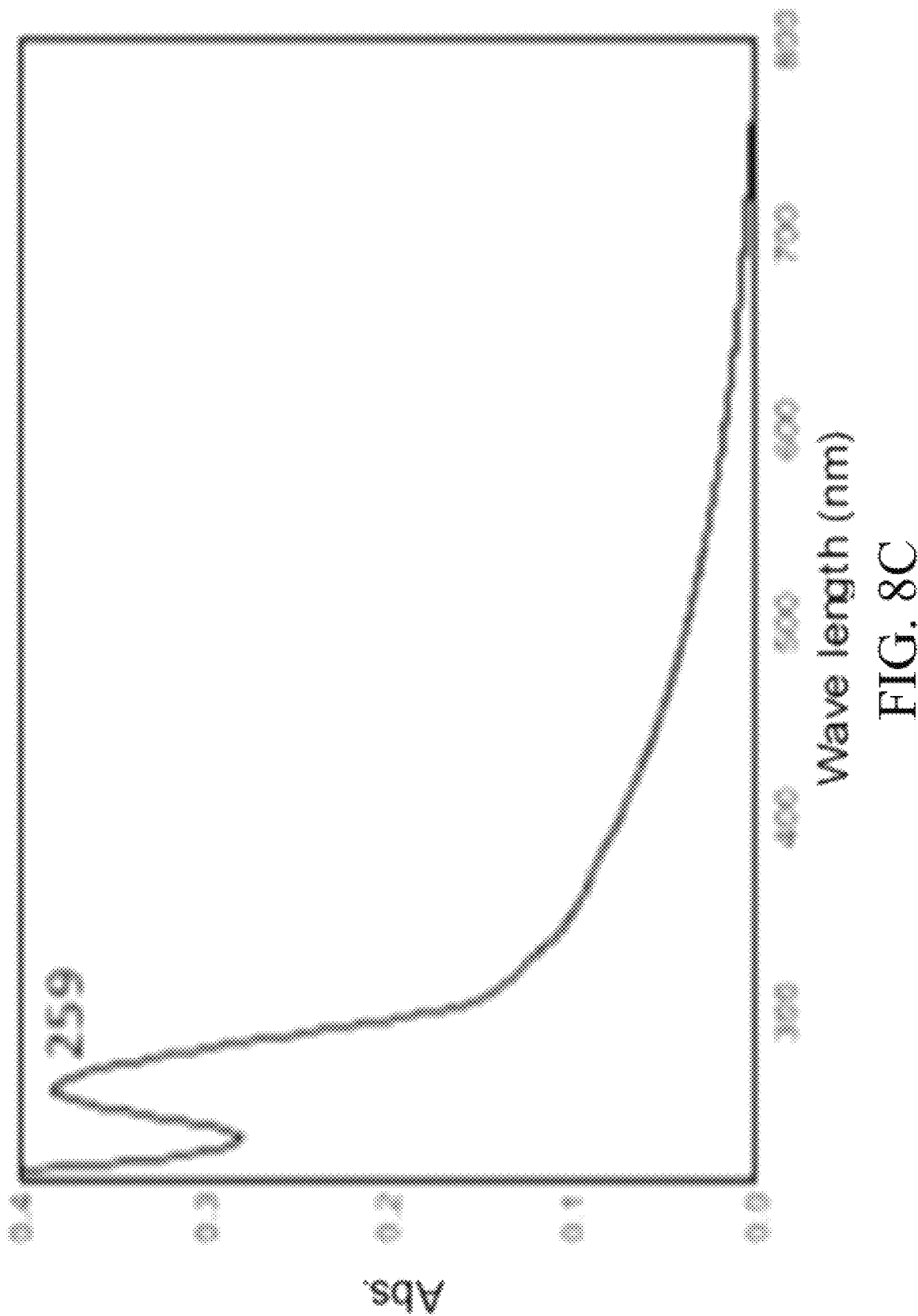
FIG. 8c is an electronic spectra of graphene oxide-DNA composite showing the characteristic absorption peak of DNA at 259 nm and also showing the background absorption of the graphene oxide in accordance with some embodiments of the presently disclosed subject matter.

In some embodiments of the presently disclosed method of reversible encapsulation within the wsCNP, DNA can be encapsulated within GO as described in Example 2. Particularly, calf thymus DNA was mixed with an aqueous-alcoholic solution of GO, and the resultant clear solution was vacuum dried at −37° centigrade yielding GO-DNA composite. The composite was washed with cold water to remove free DNA not encapsulated within the wsCNP. Electronic spectra were compared in PBS at pH 6.5 for the DNA alone, GO alone, and the GO-DNA composite dissolved in the buffer. FIG. 8A illustrates the electronic spectra for the calf thymus DNA alone, showing a peak at 259 nm. FIG. 8B is the electronic spectra for the GO alone. FIG. 8C is the electronic spectra for the GO-DNA composite, showing the characteristic absorption peak of DNA at 259 nm and also showing the background absorption of the GO. FIGS. 8A-8C demonstrate that fragments of DNA or other types of nucleic acid molecules (such as those encoding a gene of interest or a siRNA, for example), can be encapsulated in the wsCNP.

In some embodiments, a wsCNP can be encapsulated with any of the lanthanides. It should be appreciated that lanthanides are useful as imaging agents and sensors. For the encapsulation, one or more lanthanides can be mixed with an aqueous or alcoholic solution of wsCNP in the open form. A structural change in the wsCNP to a closed form can be allowed for, wherein the encapsulated lanthanide can be released from the closed form wsCNP upon exposure to a pH of about 7.2 or greater. In some embodiments, the closed form wsCNP can be washed to remove free lanthanide not encapsulated within the wsCNP.

In some embodiments of the disclosed method of reversible encapsulation, the molecule is an imaging agent and/or a therapeutic agent, such as (but not limited to) a therapeutic agent for the treatment of cancer. In some embodiments, the molecule can be donepezil, TPP, a protein, a peptide, a small molecule, a nucleic acid, a single strand DNA, a double strand DNA, an RNA, an siRNA, an oligonucleotide, a gene, a gene fragment, an imaging agent, and/or a lanthanide.

In some embodiments, the molecule can be a therapeutic agent for the treatment of a brain disorder, including (but not limited to dementia, vascular dementia, and/or Alzheimer's disease). In some embodiments, the molecule can be a therapeutic agent for delivery in a subject across the blood brain barrier (BBB).

Figure 9:
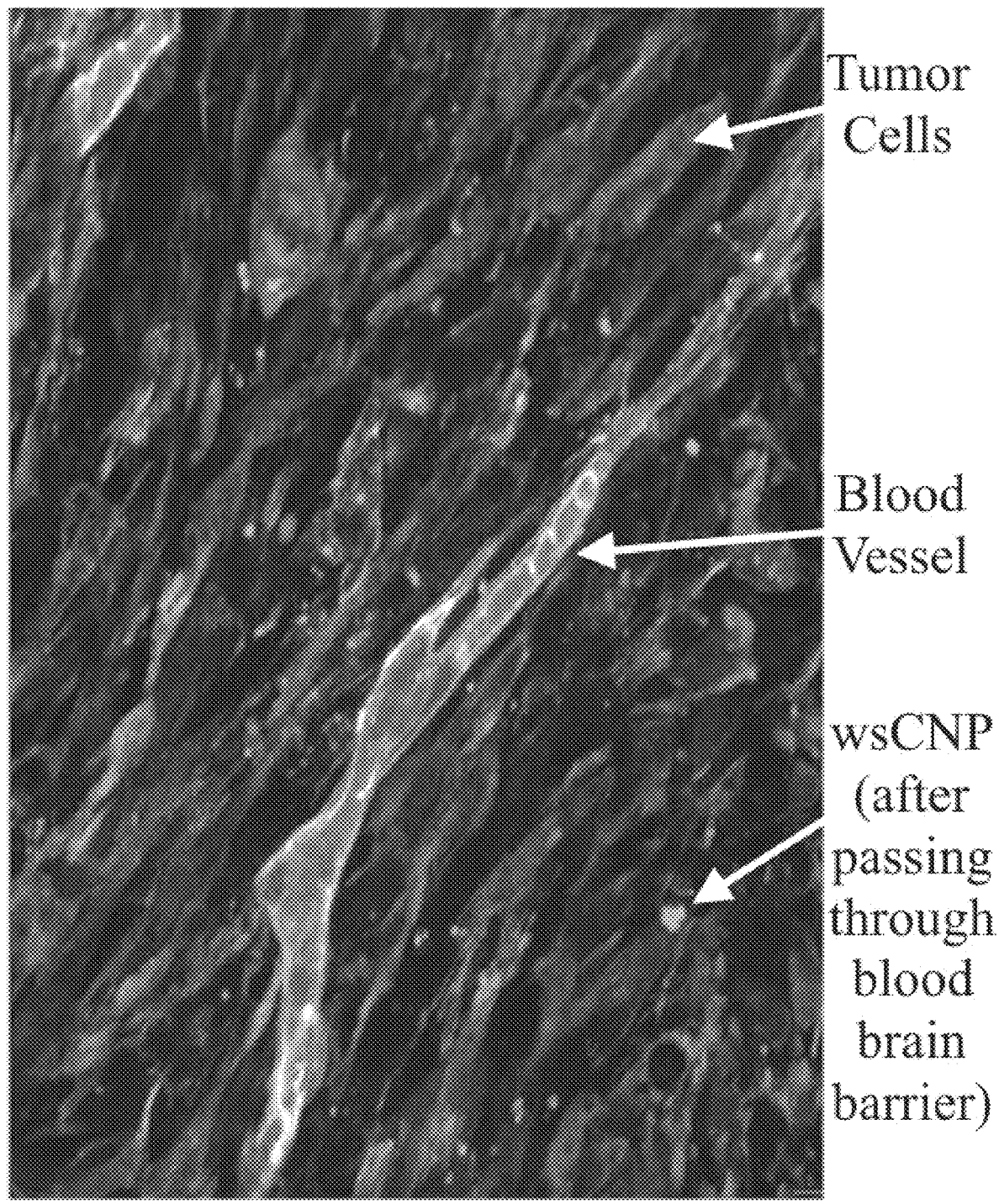
FIG. 9 is a microscopic image of a mouse brain in which the wsCNP has crossed the BBB into the brain according to one or more embodiments of the presently disclosed subject matter.
Figure 10A:
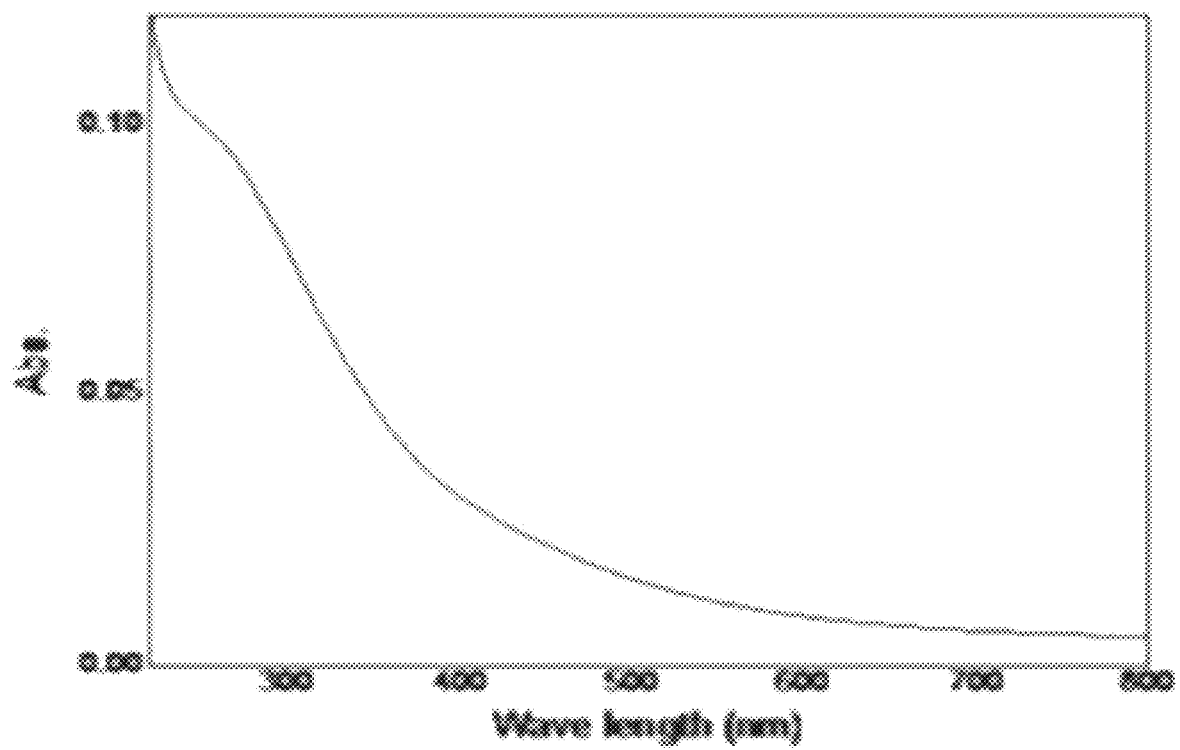
FIG. 10a shows electronic spectra of untreated graphene oxide in ethanol in accordance with some embodiments of the presently disclosed subject matter.
Figure 10B:
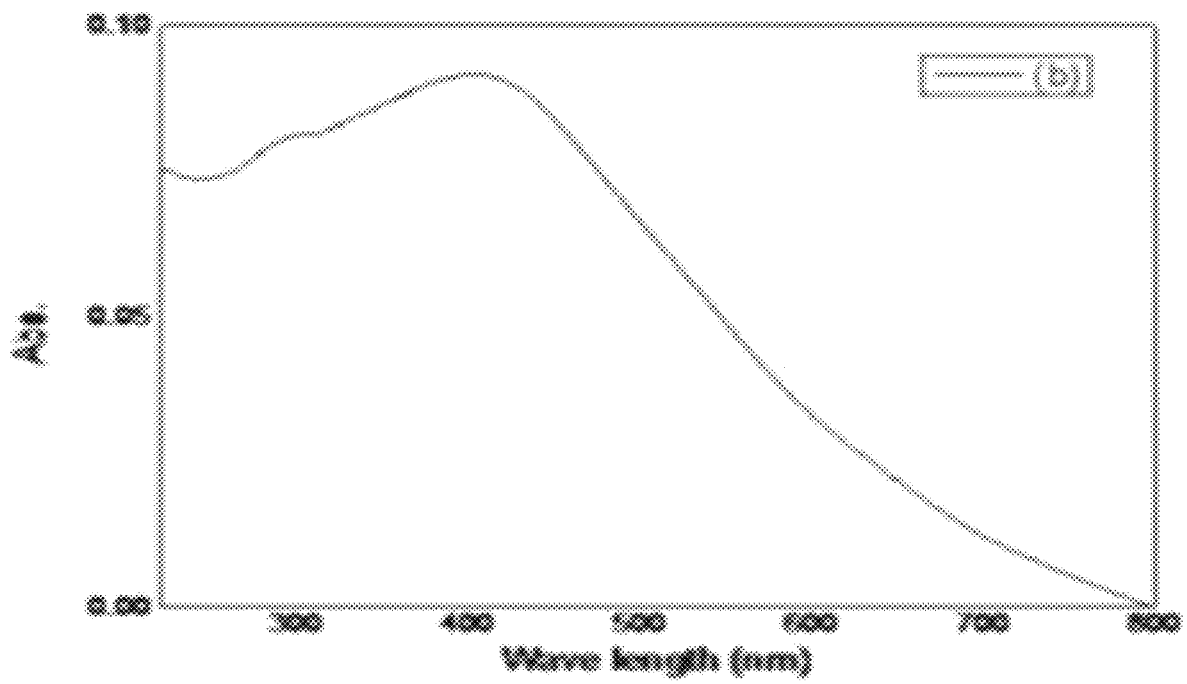
FIG. 10b shows electronic spectra of $Mn(acac)_3$ in ethanol in accordance with some embodiments of the presently disclosed subject matter.
Figure 10C:
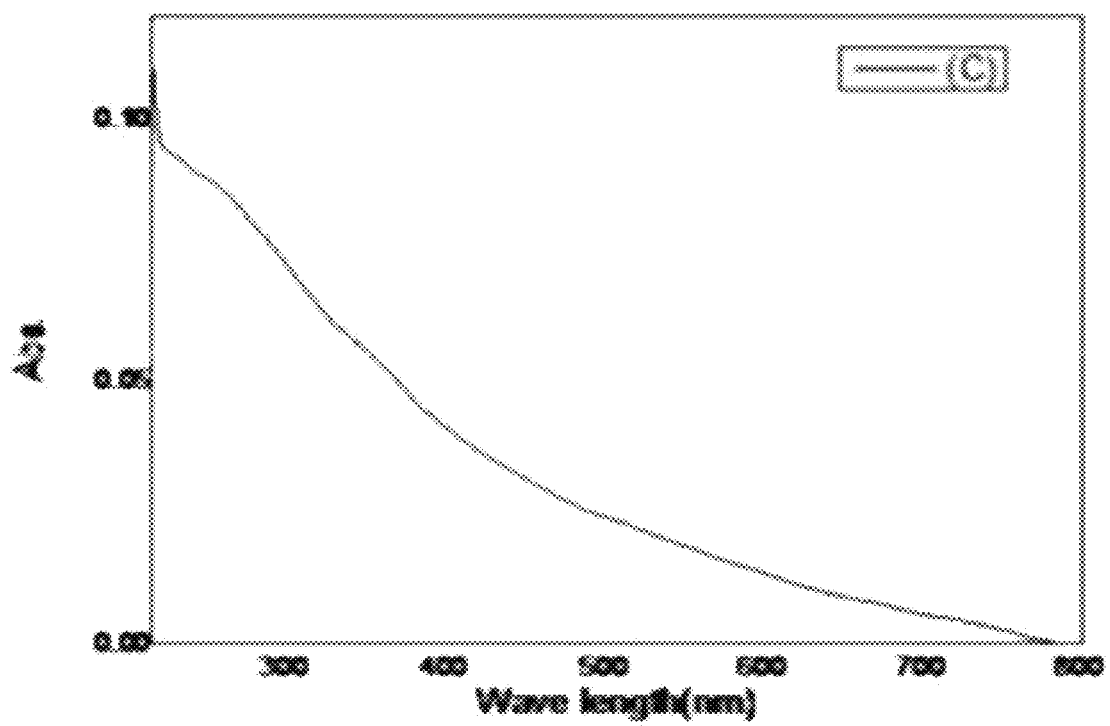
FIG. 10c shows electronic spectra of graphene oxide containing Mn(acac) in accordance with some embodiments of the presently disclosed subject matter.
Figure 10D:
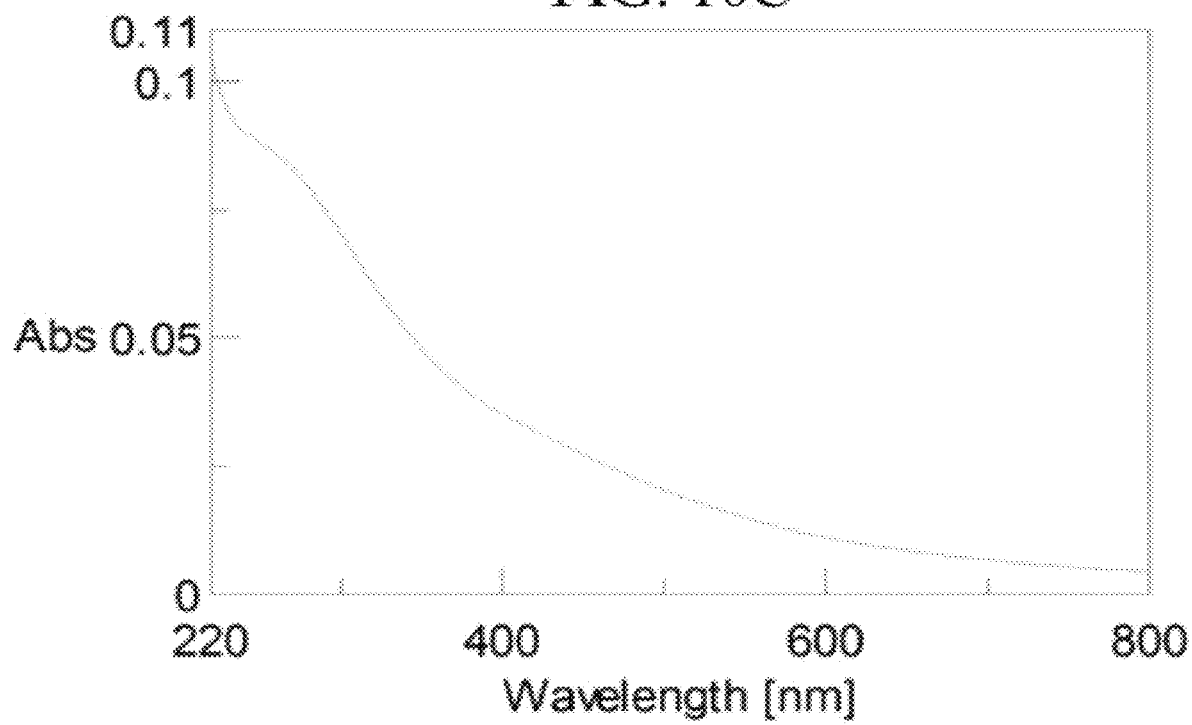
FIG. 10d shows simulated spectra of combined graphene oxide and $Mn(acac)_3$ in accordance with some embodiments of the presently disclosed subject matter.

In some embodiments, a method is provided for using the wsCNP to cross the blood brain barrier (BBB). An experiment is described in Example 3 in which wsCNP was injected into the tail of transgenic mice. The transgenic mice have pericyte dysfunction, associated with neurodegenerative diseases. Pericyte function is an important component of the neurovascular unit that contributes to the integrity of the BBB. BBB disruption or disintegrity in the affected the brain can allow for passive diffusion. By intravenous administration of the wsCNP to a mouse, it was demonstrated that the fluorescent wsCNP smoothly crossed the BBB into the brain of transgenic FVBN mice. FIG. 9 shows an image of the mouse brain in which the wsCNP has crossed the BBB into the brain. In FIG. 9, each of the tumor cells, blood vessels, and wsCNP are indicated with arrows, showing the ability of the wsCNP to cross the BBB. Importantly, prior art methods make use of passive diffusion or active transport. Passive diffusion includes fat-soluble substances dissolve (amphiphilic) in the cell membrane and cross the BBB (e.g., alcohol, caffeine, nicotine). Active transport includes substances that the brain needs, such as glucose and amino acids, that are carried across the BBB by special transport proteins (i.e., specific receptors, protein mediated). The presently disclosed nanoparticles, however, in some embodiments operate through receptor-mediated transport, wherein molecules link up to receptors on the surface of the brain and are escorted through (e.g., insulin). Thus, a key differentiator of the disclosed nanoparticles is that they have the ability to carry any drug through the BBB.

In some embodiments of reversible encapsulation of molecules within the wsCNP, the wsCNP can further include one or more biomolecules or divalent metals to target delivery of the wsCNP to a cell, tissue, brain, or organ. The biomolecule can be one or a combination of a protein, a receptor, an aptamer, a ligand, or an antibody. The divalent metal can be manganese. For example, Example 4 describes incorporation of manganese (Mn) or another divalent metal into the wsCNP to allow for targeting of the wsCNP to the brain. In this manner, the wsCNP containing Mn can utilize the capacity of Mn to be taken up by nerve terminals via the bivalent metal transporter of the olfactory nerves where it can be further transported to the entire brain (see, for example, International Patent Application Publication WO 2013/040295 which is hereby incorporated by reference in its entirety). In a first experiment, manganese acetylacetonate ($Mn(acac)_3$) was incorporated into the GO produced according to the method in Example 1 by mixing the GO and $Mn(acac)_3$ in ethanol. The solution was vacuum dried at −37° C. resulting in a solid powder form. The powdered mass was washed with distilled water to remove any excess $Mn(acac)_3$. FIGS. 10A-10D show electronic spectra of the: A) Untreated GO in ethanol; B) $Mn(acac)_3$ in ethanol; C) GO containing $Mn(acac)_3$; and D) Simulated spectra of combined GO and $Mn(acac)_3$. The spectral data show that the Mn remains associated with the GO at the pH 6.5. This experiment is an example showing that a bivalent metal such as Mn can be incorporated into the wsCNP to take advantage of the metal transporter to target delivery of the wsCNP to the brain. Thus, wsCNP can be loaded with a therapeutic agent and/or an imaging agent and also contain incorporated divalent metal to advantage of the metal transporter to target delivery of the wsCNP contents to the brain of a subject.

In some embodiments, the presently disclosed subject matter is directed to a water soluble carbon nanoparticle (wsCNP) comprising a molecule encapsulated therein. In some embodiments, the wsCNP can include a plurality of graphene sheets in a closed form at a pH of about 6.8 or less. In some embodiments, a molecule is encapsulated within the closed form wsCNP, wherein a plurality of carboxylic and hydroxyl groups are present on the plurality of sheets, and wherein the molecule can be released from the closed form wsCNP at a pH of about 7.2 and higher. In some embodiments, the carboxylic groups can comprise at least about 20% of the total weight of the wsCNP. In some embodiments, the wsCNP can have a solubility in aqueous solution at a concentration of about 1 mg wsCNP/ml. In some embodiments, the wsCNP can display fluorescence in the blue, green, red, and infra-red spectra. In some embodiments, the wsCNP can have amphiphilic properties.

In some embodiments, a majority of the graphene sheets present in the closed form wsCNP having a molecule encapsulated therein has a diameter ranging from about 2 nm to 120 nm. In some embodiments, a majority of the graphene sheets present in the closed form wsCNP having a molecule encapsulated therein has a diameter ranging from about 40 nm to 120 nm.

In some embodiments, the wsCNP comprising a molecule encapsulated therein can be produced by a method including: treating a material comprising one or a combination of wood charcoal, low grade coal, or carbonized plant biomass in a dilute alkali solution; and separating the solution from the insoluble material and neutralizing the solution, wherein a precipitate that appears after neutralization of the solution comprises graphene oxide nanoparticles having a plurality of sheets ranging in size from about 40 nm to 200 nm in the open form.

In some embodiments, the wsCNP having a molecule encapsulated therein can be produced by a process consisting essentially of treating a material including one or a combination of wood charcoal, low grade coal, or carbonized plant biomass in an alkali solution, wherein a precipitate that appears after neutralization of the solution comprises graphene oxide nanoparticles having a plurality of sheets ranging in size from about 40 nm to 200 nm in the open form.

In some embodiments, the process for producing the wsCNP having a molecule encapsulated therein can further include washing the precipitate with cold water.

In some embodiments, the molecule encapsulated within the wsCNP can be an imaging agent and/or a therapeutic agent, such as a therapeutic agent for the treatment of cancer. In some embodiments, the molecule encapsulated within the wsCNP can be a therapeutic agent for the treatment of a brain disorder, such as (but not limited to) dementia, vascular dementia, and/or Alzheimer's disease.

In some embodiments, the molecule encapsulated within the wsCNP can be Donepezil, TPP, a protein, a peptide, a small molecule, a nucleic acid, a single strand DNA, a double strand DNA, an RNA, an siRNA, an oligonucleotide, a gene, a gene fragment, an imaging agent, and/or a lanthanide.

In some embodiments, the molecule encapsulated within the wsCNP can be for delivery in a subject across the blood brain barrier (BBB).

In some embodiments, the wsCNP having a molecule encapsulated therein can further include one or more biomolecules or divalent metals to target delivery of the wsCNP with the encapsulated molecule to a cell, tissue, brain, and/or organ. In some embodiments, the biomolecule can be a protein, a receptor, an aptamer, a ligand, and/or an antibody. In some embodiments, the divalent metal can be manganese. In some embodiments, the cell can be a cancer cell.

In some embodiments, the presently disclosed subject matter is directed to a method of delivering a molecule to a subject. Particularly, the method comprises delivering to the subject a composition including a water soluble carbon nanoparticle (wsCNP) having the molecule encapsulated therein, wherein the encapsulated molecule is released from the wsCNP into the subject as a result of the increase in pH after delivery to the subject's body.

In some embodiments, the wsCNP can include a plurality of graphene sheets in the closed form at a pH of about 6.8 or less, wherein the molecule is encapsulated within the closed form wsCNP, and wherein a plurality of carboxylic and hydroxyl groups are present on the plurality of sheets. In some embodiments, the carboxylic groups can comprise at least about 20% of the total weight of the wsCNP. In some embodiments, the wsCNP can have a solubility in aqueous solution at a concentration of about 1 mg wsCNP/ml. In some embodiments, the wsCNP can display fluorescence in the blue, green, red, and infra-red spectra. In some embodiments, the wsCNP can have amphiphilic properties.

In some embodiments, a majority of the graphene sheets present in the closed form wsCNP having a molecule encapsulated therein can have a diameter ranging from about 2 nm to 120 nm, such as from about 40 nm to 120 nm.

In some embodiments, the wsCNP having a molecule encapsulated therein can be produced by a process including: treating a material comprising one or a combination of wood charcoal, low grade coal, or carbonized plant biomass in a dilute alkali solution; and separating the solution from the insoluble material and neutralizing the solution, wherein a precipitate that appears after neutralization of the solution comprises graphene oxide nanoparticles having a plurality of sheets ranging in size from about 40 nm to 200 nm in the open form.

In some embodiments, the wsCNP having a molecule encapsulated therein can be produced by a process consisting essentially of treating a material including one or a combination of wood charcoal, low grade coal, or carbonized plant biomass in an alkali solution, wherein a precipitate that appears after neutralization of the solution includes graphene oxide nanoparticles having a plurality of sheets ranging in size from about 40 nm to 200 nm in the open form. In some embodiments, the process for producing the wsCNP having a molecule encapsulated therein can further include washing the precipitate with cold water.

In some embodiments, delivering to the subject can include intravenous injection of the subject with the composition comprising the wsCNP. In some embodiments, delivering to the subject can include inhalation of the composition comprising the wsCNP.

In some embodiments, the molecule encapsulated within the wsCNP can be an imaging agent and/or a therapeutic agent. In some embodiments, the molecule encapsulated within the wsCNP can be a therapeutic agent for treatment of cancer and/or a brain disorder. In some embodiments, the brain disorder can comprise dementia, vascular dementia, and/or Alzheimer's disease.

In some embodiments, the molecule encapsulated within the wsCNP can be one or a combination of Donepezil, TPP, a protein, a peptide, a small molecule, a nucleic acid, a single strand DNA, a double strand DNA, an RNA, an siRNA, an oligonucleotide, a gene, a gene fragment, an imaging agent, or a lanthanide.

In some embodiments, the molecule encapsulated within the wsCNP can be for delivery in a subject across the blood brain barrier (BBB).

In some embodiments, the wsCNP having a molecule encapsulated therein can further include one or more biomolecules or divalent metals to target delivery of the wsCNP with the encapsulated molecule to a cell, tissue, brain, or organ. In some embodiments, the biomolecule can be a protein, a receptor, an aptamer, a ligand, or an antibody. In some embodiments, the divalent metal can be manganese. In some embodiments, the cell can be a cancer cell.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Preparation of Graphene Oxide Nanoparticles (GO)

The presently disclosed subject matter includes an eco-friendly method of producing graphene oxide (GO) nanoparticles from wood charcoal or low grade coal, where the graphene sheets have an open size range of about 40-200 nm.

Wood charcoal or low grade coal in powdered form was repeatedly washed with toluene and/or acetone using a Soxhlet extractor, followed by washing with dilute hydrochloric acid, rinsing with water, and drying in air to reduce/eliminate aromatic hydrocarbons and other associated soluble organic compounds. The dried black powder was treated in 10% sodium hydroxide solution and stirred magnetically at 40° C. to produce a yellow-brown colored solution. The solution was separated and neutralized with dilute hydrochloric acid at pH of about 7. Upon standing, a yellow-brown flaky precipitate appeared. The precipitate was separated by centrifugation, washed with cold water to free it from chloride, and on dried in air. A red-brown solid with yield ranging from 8 to 12% (based on the source material used) was produced.

The material was analyzed using spectroscopy, microscopy, and XRD, which showed the GO to have a size ranging from 40 nm to 200 nm as observed by DLS, AFM, and SEM study. FIG. 1A shows a size distribution of GO determined using DLS. In addition, the analysis revealed that the GO produced by this method was freely soluble in alcohol and in water above neutral pH, and somewhat less soluble in the aqueous-acidic pH range. Upon aging overnight, in acidic pH (<=6.8), or after drying under vacuum, the structure of the GO was observed to change from oblique arches like a palm of a hand to a clenched fist (a closed sphere). The clenched fist reverts back to the open fist form at physiological pH of 7.4. FIG. 2B shows an electronic spectra of GO (solid line for freshly prepared GO; dotted line for aged GO). FIG. 3C shows an electronic spectrum of the GO in PBS buffer pH 6.8 (solid line) and PBS buffer pH 7.4 (dotted line). At pH 6.8, the absorption at 260 nm shows a distinctive peak, but at pH 7.4 the contour of the peak appears as a shoulder. The changes to the absorption features are similar to those observed with the aged sample in alcohol. The spectra cross points when the GO was present at pH 6.8 versus when it was present at pH 7.4. The distinct change in the electronic spectra could be used as the marker to identify the two structural forms, namely the open-fist (basic pH) and clenched-fist (spherical, acidic pH) forms.

Figure 2A:
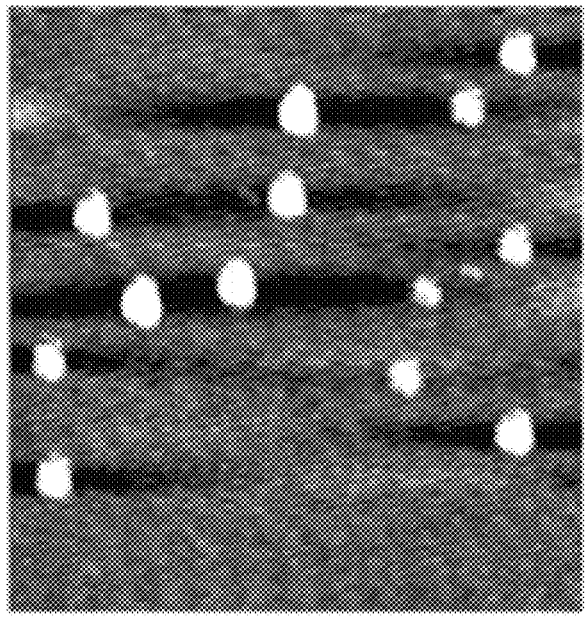
FIG. 2a is an atomic force microscopy (AFM) image of open fisted graphene oxide in accordance with some embodiments of the presently disclosed subject matter.
Figure 2B:
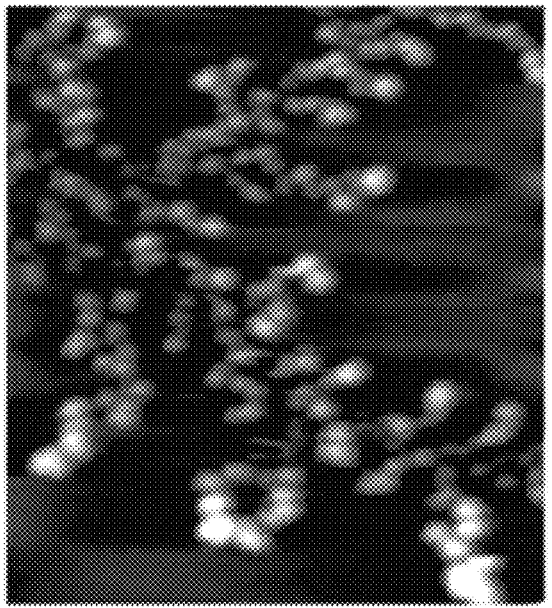
FIG. 2b is an AFM image of aged closed fisted graphene oxide in accordance with some embodiments of the presently disclosed subject matter.
Figure 2C:
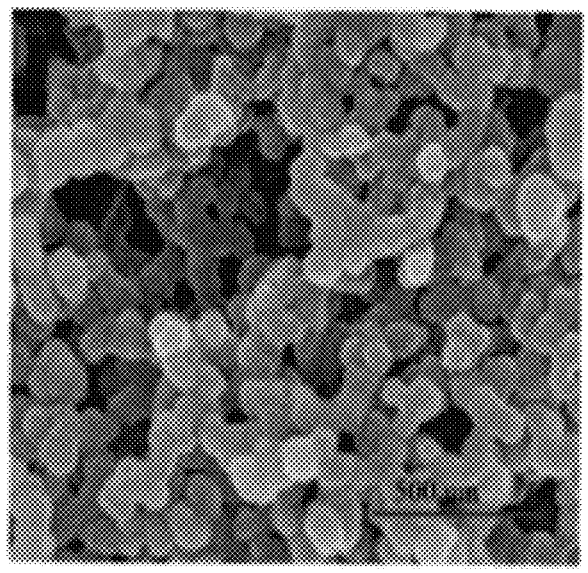
FIG. 2c is a scanning electronic microscopy (SEM) image of graphene oxide open fished from on exposure with ammonia vapor in accordance with some embodiments of the presently disclosed subject matter.
Figure 2D:
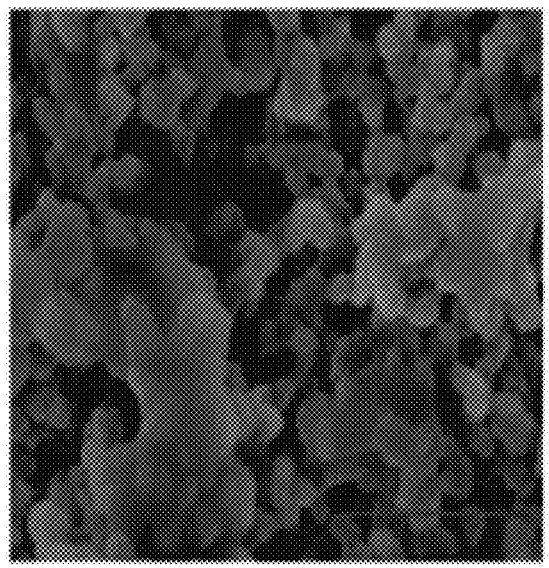
FIG. 2d is an SEM image of close fisted graphene oxide in accordance with some embodiments of the presently disclosed subject matter.
Figure 2E:
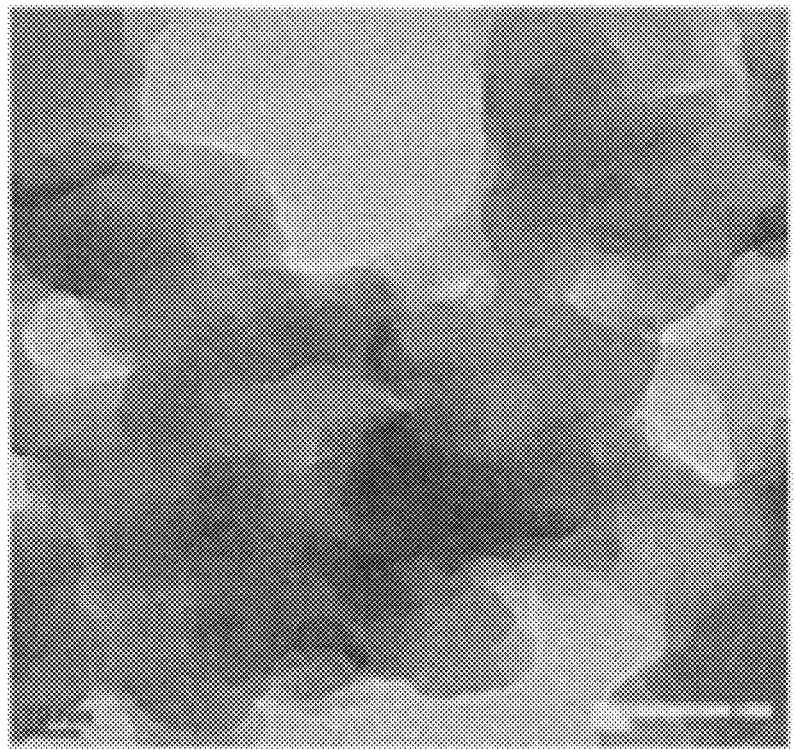
FIG. 2e is a high resolution transmission electron microscopy (HRTEM) image of open fisted graphene oxide in accordance with some embodiments of the presently disclosed subject matter.
Figure 2F:
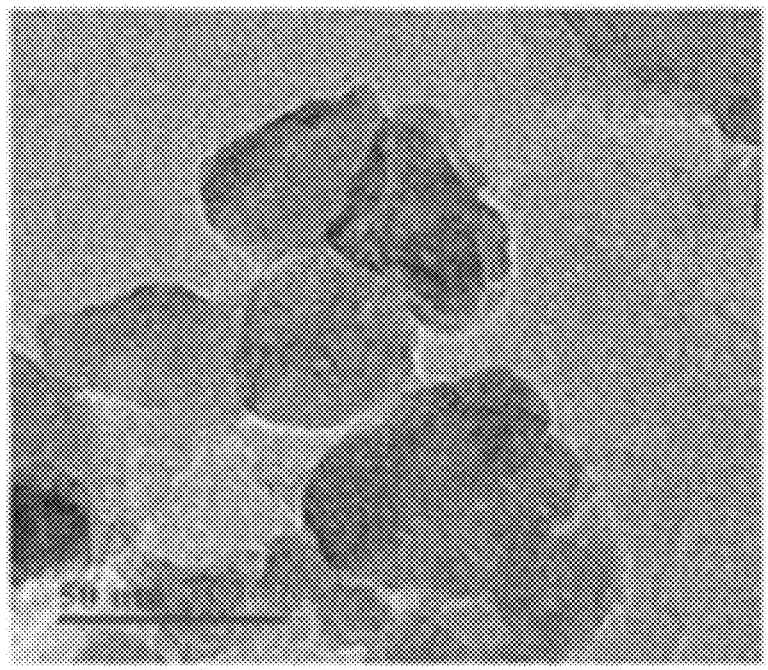
FIG. 2f is an HRTEM image of close fisted graphene oxide in accordance with some embodiments of the presently disclosed subject matter.

FIG. 2A is an Atomic Force Microscopy (AFM) image of open fisted GO. FIG. 2B is an AFM image of aged close fisted GO. FIG. 2C is a Scanning Electronic Microscopy (SEM) image of GO open fist form upon exposure with ammonia vapor. FIG. 2D is a SEM image of close fisted GO. FIG. 2E is a High Resolution Transmission Electron Microscopy (HRTEM) image of open fist GO. FIG. 2F is an HRTEM image of closed fist GO.

Without being limited to any specific mechanism of action, the hypothesis that the GO nanoparticles were converting between the closed and open forms as a result of an epoxide-diol inter-conversion was tested. The closed GO is roughly spherical and can be expected to be thermodynamically more stable than the open fist form. It is believed that several adjacent phenolic hydroxyl groups on the surface of the GO participate in epoxide formation, resulting in the creation of an oblique arch like a palm of a hand that can close to a spherical form. The hypothesis was tested by the deuterolysis of the GO in closed fist form. Specifically, the GO was treated with $ND_4OD$-$HD_2O$ and dried under vacuum at $-37°$ C.

FIG. 3A shows the FTIR spectra of the open fisted GO form after treatment in $NH_4OH$—$H_2O$ and drying under vacuum at $-37°$ C. The spectra in FIG. 3A shows an absence of epoxide vibration with the appearance of a common v(OH) vibration for diol merged with the v(OH) vibration from carboxylic acid group. FIG. 3B shows the FTIR spectra for GO treated with dilute hydrochloric acid and evaporated under vacuum. FIG. 3C shows the FTIR spectra GO treated with $ND_4OD$-$D_2O$ and dried under vacuum at $-37°$ C. FIG. 3C shows the appearance of v(OD) around 2600 $cm^{-1}$ and shows the disappearance of a peak around 1000 $cm^{-1}$, responsible for the epoxide vibration (C—O—C).[6] When GO was treated with dilute hydrochloric acid and evaporated under vacuum, a (C—O—C) vibration around 1000 $cm^{-1}$ (FIG. 3B) was observed, which is not apparent in the spectra of FIG. 3A or 3C. In FIG. 3A, an epoxide vibration was not observed, but there was a vOH at 3500 $cm^{-1}$, indicating an open fisted form of the GO under basic ($NH_4OH$—$H_2O$) conditions. FIG. 3B shows an epoxide vibration (C—O—C) around 1000 $cm^{-1}$ and the presence of vOH at 3500 $cm^{-1}$. In FIG. 3C, the spectra confirms the epoxide-diol interconversion (presence of epoxide vibration) and shows appearance of vOD around 2600 $cm^{-1}$ and the disappearance of a peak around 1000 $cm^{-1}$, confirming the open fist form of GO in the $ND_4OD$-$D_2O$. The addition of $ND_4OD$-$D_2O$ opens the GO closed fist form, which is shown in the FTIR spectra of FIG. 3C.

Figure 4B:
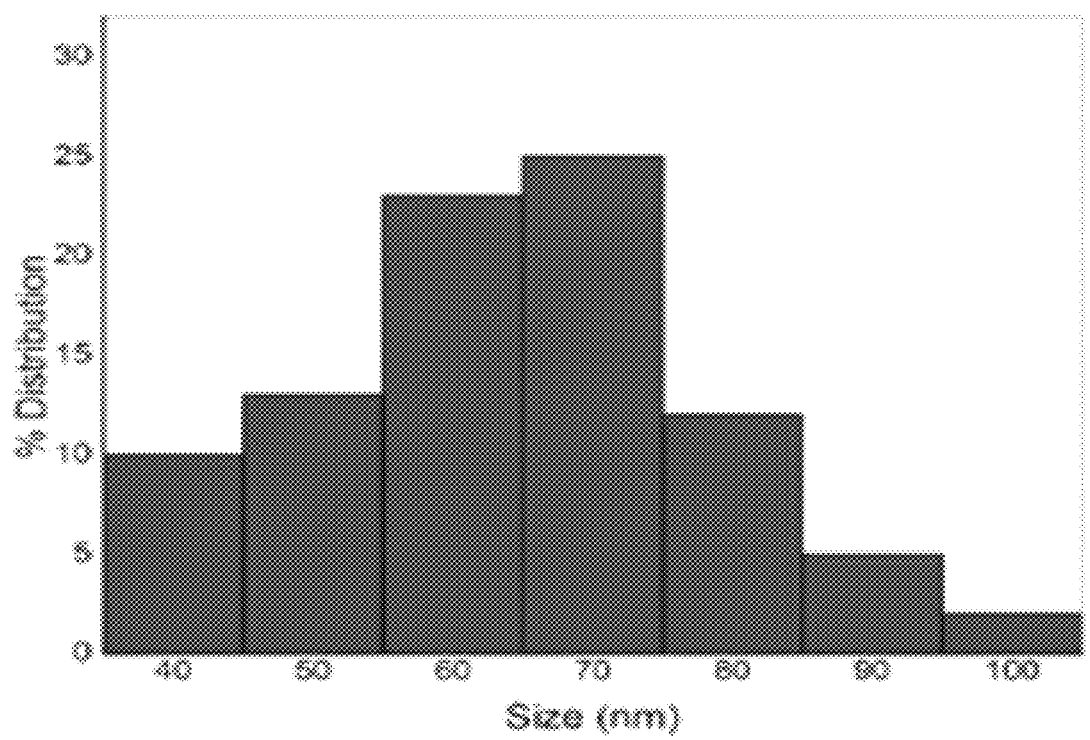

Without desiring to be limited to any particular mechanism of action, it is believed that the π-π stacking in the honeycomb hexagon structure of carbon in graphene is counteracted with the introduction of several oxo-functional groups on the surface of GO. In the case of graphene quantum dots (see, e.g., U.S. Pat. No. 8,357,507), the size is limited to within 20 nm; such a small unit with non-planar structure may not be expected to have enough surface area for an energy stabilized spherical shape. In contrast, a larger surface graphene oxide area (such as the GO resulting from the method provided herein in Example 1) would be expected to respond to energy savings and result in a more stable clenched fist (spherical) form. A size range of 40 nm to 200 nm with maximum distribution in the range of 60-140 nm was determined for the open form of the GO using DLS analysis (see FIG. 1A). The length and breadth of the open form of the GO was also measured by AFM (see FIGS. 4A-4B). These data were used to calculate the expected size of the closed GO sphere structure formed by either two open fist sheets (two superficial halves) combining at the edges to form a spherical shape or by closure of a single sheet. The AFM data are shown in the histogram size distribution graphs of FIG. 4. Particularly, FIG. 4A illustrates the size distribution of GO in the open fist structure. FIG. 4B illustrates the size distribution of GO in the closed fist, spherical structure. The range of size distribution observed for the open and closed fist forms of GO using AFM indicates the possibility of either a single sheet closure or closure of two or more sheets, and the closed spherical form is energetically favored.

Experimental Methods

Electronic spectral measurements were carried out with JASCO, V-630 spectrophotometer and fluorescence spectra were recorded with Photon Technology International (PTI) QuantaMaster™ 300. For Scanning Electron Microscopy (SEM), a SUPRA 40VP field-emission SEM (Carl Zeiss NTS GmbH, Oberkochen, Germany) equipped with an energy-dispersive X-ray (EDX) unit, in high-vacuum mode operated at 10 kV was used for the visualization of the size and morphology of GO and GO-TPP. The powder X-ray diffraction data was collected on a Bruker D8 Advance X-ray diffractometer using Cu Kα radiation (λ=1.5418 Å) generated at 40 kV and 40 mA. Five mg of GO sample was dissolved in 100 ml ethanol to determine the particle size using dynamic light scattering (DLS), nanotrac wave, model, W3222. TEM and images were taken on FEI, TECHNAI-T-20 machine operated on the voltage 200 kV.

Example 2

Methods for Encapsulation and Release of Molecules within Water Soluble Carbon Nanoparticles (wsCNPs)

Based on the observation of the reversible structural change between the open and closed spherical forms of the GO resulting from pH variation, the ability of the GO to be loaded with and release a molecule was investigated. For these studies, the molecules tetraphenyporphyrin (TPP) and donepezil were selected. Both molecules are spectrally identifiable, and TPP is considered to be a large molecule for a therapeutic. TPP is also considered a model for several porphyrins in photodynamic therapy.[7] Donepezil is an acetylcholinesterase inhibitor for the treatment of Alzheimer's disease known chemically as (±)-2, 3-dihydro-5, 6-dimethoxy2-[[1-(phenylmethyl)-4-piperidinyl]methyl]-1H-inden-1-one hydrochloride and has an empirical formula of $C_{24}H_{29}NO_3$ and a molecular weight of 415.96. It is a white crystalline powder and is freely soluble in water, chloroform, and DCM, slightly soluble in ethanol and acetonitrile, and practically insoluble in n-hexane.

Encapsulation of the each of the molecules within the GO was performed as described. 2 mg donepezil (AdooQ Bio-Science, Irvine, Calif.) was dissolved in 6 mL water and 5 mg freshly prepared GO was separately dissolved in 5 ml ethanol. The two were mixed, left at room temperature for 4 hours, and the mixture was evaporated to dryness under vacuum at $-37°$ C. The mass was washed repeatedly with water containing very dilute hydrochloric acid and then extracted with alcohol and evaporated to dryness under vacuum at $-37°$ C., resulting in a "GO-donepezil" composite.

A similar method was followed to encapsulate TPP within the GO, by mixing a solution of TPP in toluene with a solution of freshly prepared GO dissolved in ethanol. The mixture was evaporated to dryness under vacuum at $-37°$ C., resulting in a brown solid. The solid was washed several times with toluene under sonication. In this manner, essentially all the TPP not encapsulated within the GO was removed resulting in a "GO-TPP" composite.

Figure 5A:
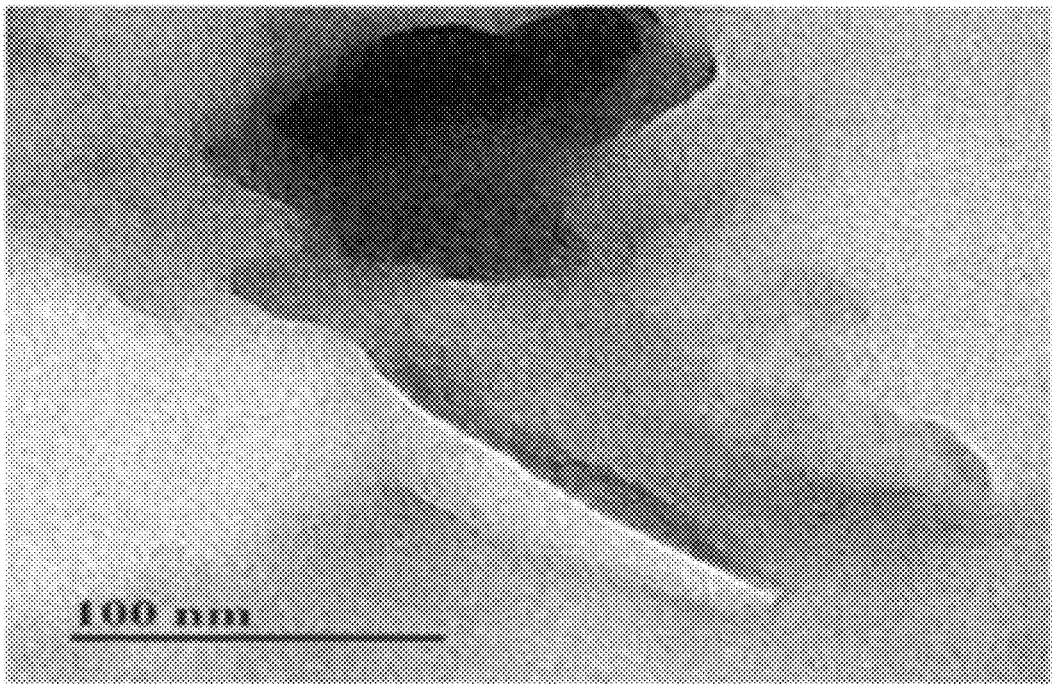
FIG. 5a is an HRTEM image of graphene oxide-TTP after treatment with $NH_3$, showing the graphene oxide in the open form in accordance with some embodiments of the presently disclosed subject matter.
Figure 5B:
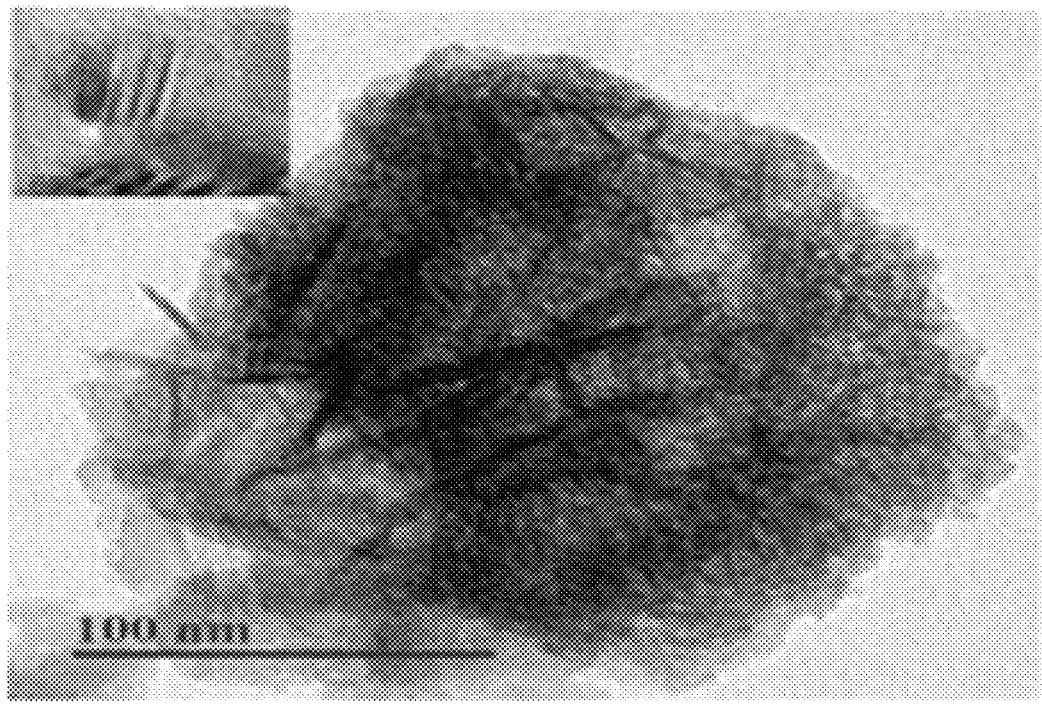
FIG. 5b is an HRTEM image of graphene oxide-TPP, showing the graphene oxide in the closed form (inset: enlarged section showing the presence of stacked TPP within the graphene oxide) in accordance with some embodiments of the presently disclosed subject matter.
Figure 5C:
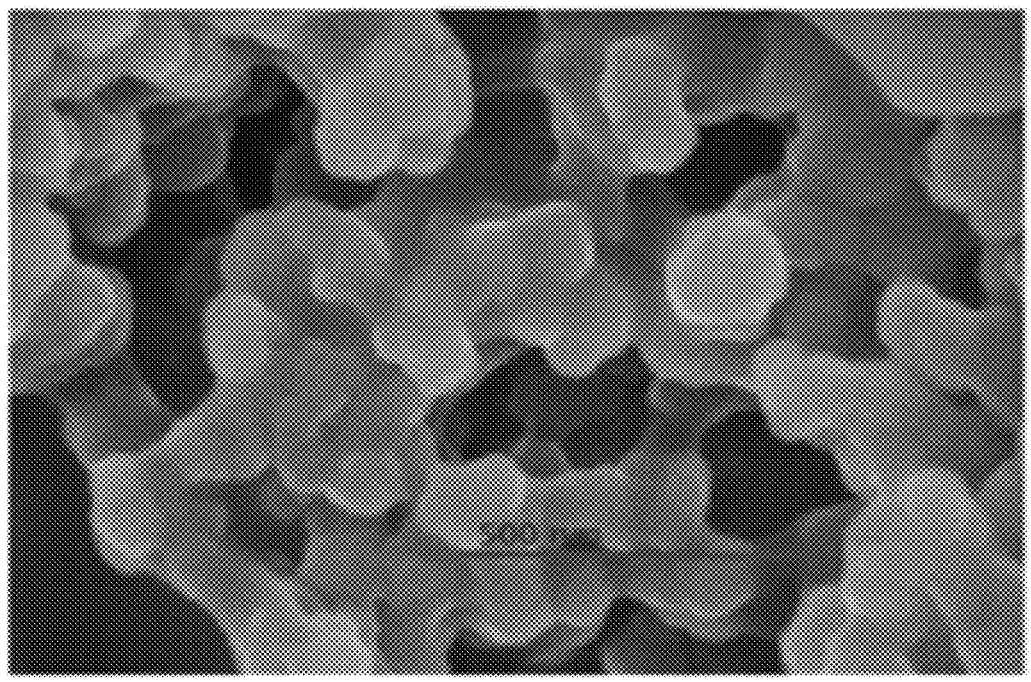
FIG. 5c is an SEM image of graphene oxide-TPP after treatment with $NH_3$, showing the graphene oxide in the open form in accordance with some embodiments of the presently disclosed subject matter.
Figure 5D:
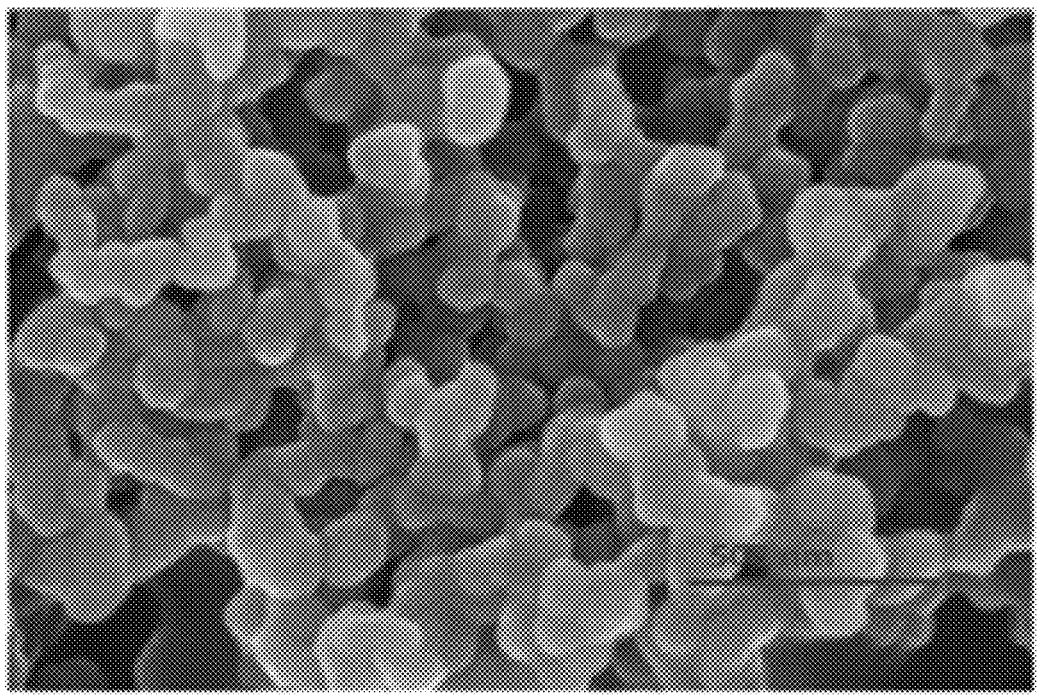
FIG. 5d is an SEM image of graphene oxide-TPP, showing the graphene oxide in the closed form in accordance with some embodiments of the presently disclosed subject matter.
Figure 5E:
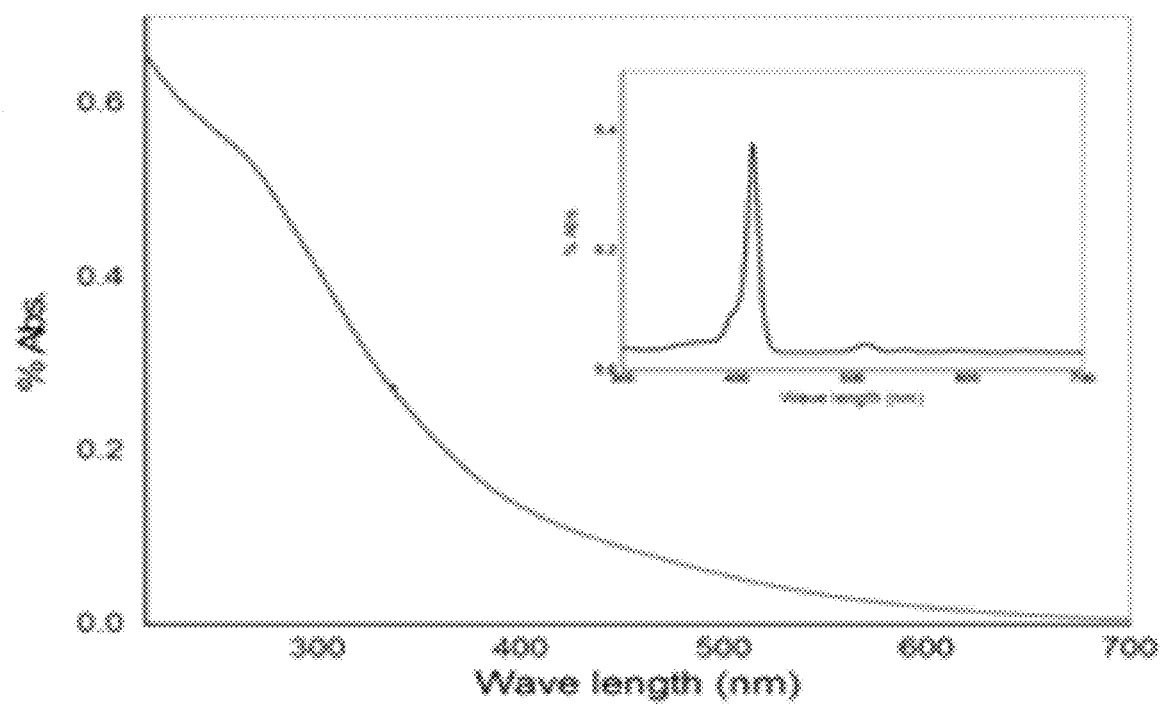
FIG. 5e is an electronic spectra of graphene oxide-TPP in PBS buffer, pH 7.4, showing the open form of the graphene oxide (inset: electronic spectrum of dichloromethane extract) in accordance with some embodiments of the presently disclosed subject matter.
Figure 5F:
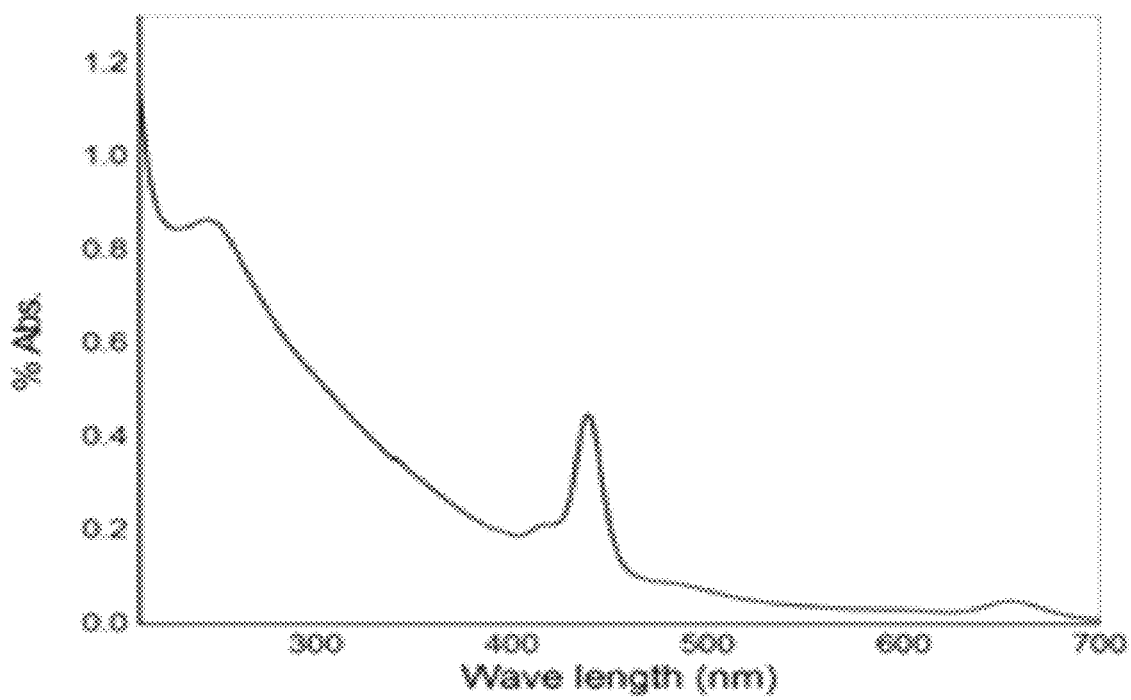
FIG. 5f is an electronic spectra of the graphene oxide-TPP in PBS buffer, pH 6.8, showing features of the encapsulated TPP within the closed form in accordance with some embodiments of the presently disclosed subject matter.
Figure 5G:
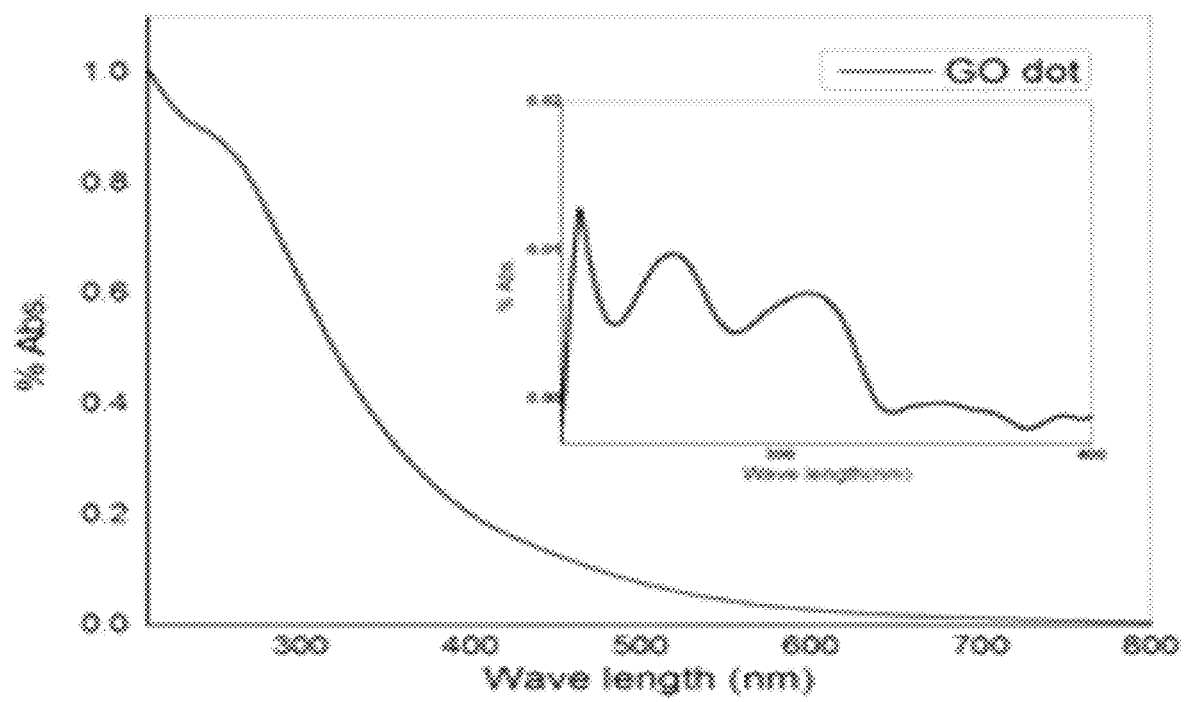
FIG. 5g is an electronic spectra of graphene oxide-donepezil in PBS buffer, pH7.4, showing the open form of graphene oxide (inset: electronic spectrum of dichloromethane extract showing the features of donepezil) in accordance with some embodiments of the presently disclosed subject matter.
Figure 5H:
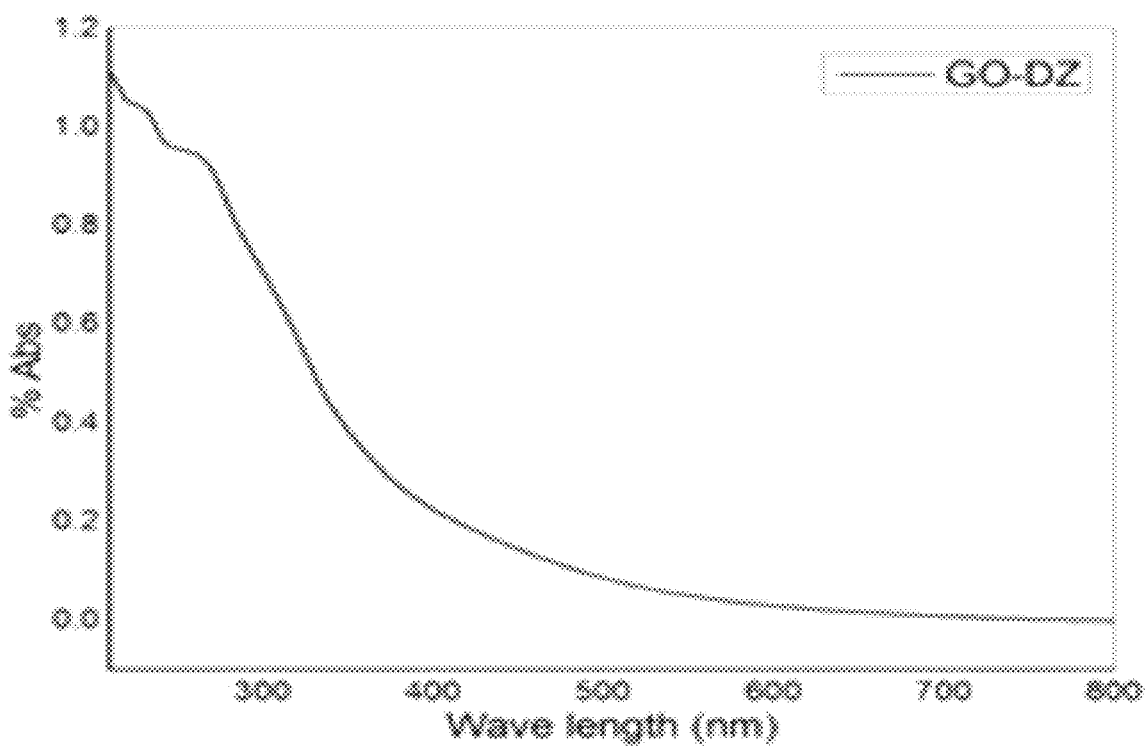
FIG. 5h is an electronic spectra of graphene oxide-donepezil in PBS buffer, pH6.8, which shows features of the encapsulated donepezil within the closed form of the graphene oxide in accordance with some embodiments of the presently disclosed subject matter.

The composites were subjected to various spectroscopic and microscopic investigations, shown in FIGS. 5A-5H. Electronic spectral measurements and microscopic analyses were carried out according to the experimental methods described in Example 1 above. Both TPP and donepezil are insoluble in water. FIG. 5A is an HRTEM image of the GO-TPP composite prepared as described above and after treatment with NH$_3$ to increase the pH, showing the GO in the open form. FIG. 5B is an HRTEM image of the GO-TPP prepared as described above, showing the GO in the closed form, and an inset of an enlarged section of the composite that shows the presence of stacked TPP within the GO. FIG. 5C is an SEM image of the GO-TPP composite after treatment with NH$_3$ to increase the pH, showing the GO in the open form. FIG. 5D is an SEM image of the GO-TPP composite prepared as described above, showing the GO in the closed form. FIG. 5E is an electronic spectrum of GO-TPP composite prepared as described above in PBS buffer pH 7.4, showing the open form of the GO allowing for release of TPP (inset: electronic spectrum of dichloromethane extract of the GO-TPP buffer showing the features of TPP). FIG. 5F is an electronic spectrum of the GO-TPP prepared as described above in PBS buffer pH 6.8, showing features of the encapsulated TPP within the closed form (TPP was not detected after dichloromethane extraction of the GO-TPP buffer). FIG. 5G is an electronic spectrum of the GO-donepezil composite prepared as described above in PBS buffer pH 7.4, showing the open form of GO allowing for release of the donepezil (inset: electronic spectrum of dichloromethane extract of the GO-donepezil buffer showing the features of donepezil). FIG. 5H is an electronic spectrum of the GO-donepezil composite prepared as described above in PBS buffer pH 6.8, showing features of the encapsulated donepezil within the closed form of the GO (donepezil was not detected after dichloromethane extraction of the GO-donepezil buffer).

Powder X-ray diffraction (XRD) was also performed on the GO-TPP composite prepared according to Example 1 above. FIG. 6A is an XRD spectrum of GO prepared as described above without encapsulated TPP. FIG. 6B is an XRD spectrum of GO-TPP composite prepared as described above, showing sharp peaks for TTP along with the broad peaks of the GO. FIG. 6C is an enlarged view of the spectrum from FIG. 6B to more clearly illustrate the presence of both the broad peaks from the GO and the sharp peaks from the TPP.

The following experiments were performed to investigate whether other graphene-based water soluble carbon nanoparticles (wsCNPs) (produced by methods other than those described herein) can change from an open fist type of structure at basic pH to a closed, spherical structure at pH of about 6.8 and below. The tests were performed using water soluble quantum carbon dots (wsCdot) described in U.S. Pat. No. 8,357,507. As described in the '507 patent, wsCdot have a size range of about 2-20 nm in diameter. The wsCdot particles were prepared according to the methods described in the '507 patent and investigated using microscopic and electronic spectral measurements as described herein above for the GO. FIG. 7A shows aged wsCdot and FIG. 7B shows aged wsCdot after exposure to NH$_3$ vapour. The figures illustrate a change from a spherical structure to a flat open structure after the NH$_3$ treatment.

Donepezil dissolved in water and wsCdot separately dissolved in ethanol were mixed in a 1:10 weight ratio. The mixture was made basic at pH 8 by addition of dilute NaOH. After a few minutes, the mixture was acidified with dilute HCl to a pH around 6, and the mixture was evaporated to dryness under vacuum at −37° C. The mass was extracted with alcohol and evaporated to dryness under vacuum at −37° C., resulting in a "wsCdot-donepezil" composite. FIG. 7C illustrates electronic spectra of the wsCdot-donepezil composite in PBS, pH 6.8, where extraction with DCM did not remove the donepezil from the composite. FIG. 7D illustrates electronic spectra of the wsCdot-donepezil composite in PBS, pH 7.4, where extraction with DCM revealed a signature donepezil spectrum (shown in the inset).

Freshly prepared wsCdot in the open structure was loaded by dissolving in either water or ethanol and mixing with donepezil in water. The mixture was evaporated to dryness under vacuum at −37° C. The resulting wsCdot-donepezil composite was shown to contain encapsulated donepezil using electronic spectral analysis.

DNA was encapsulated inside the wsCNP prepared according to the method described in Example 1. Particularly, calf thymus DNA (Sigma Aldrich) was mixed with an aqueous alcoholic solution of wsCNP and the resultant clear solution was vacuum dried at −37° C. The mass was washed with cold water to remove free DNA not encapsulated within the wsCNP to produce a GO-DNA composite. Electronic spectra were compared in phosphate buffered saline at pH 6.5 for DNA alone, GO alone and the GO-DNA composite dissolved in the buffer. The results are shown in FIGS. 8A-8C. Particularly, FIG. 8A is the electronic spectra for the calf thymus DNA alone, showing a peak at 259 nm. FIG. 8B is the electronic spectra for the GO alone. FIG. 8C is the electronic spectra for the GO-DNA composite, showing the characteristic absorption peak of DNA at 259 nm and also showing the background absorption of the GO. The electronic spectrum for the GO-DNA composite was taken immediately after the dissolution of the composite the in the buffer, demonstrating that fragments of DNA or other types of nucleic acid molecules (such as those encoding a gene of interest or a siRNA, for example) can be encapsulated in the wsCNP.

A wsCNP can be encapsulated with any of the lanthanides. Lanthanides are useful as imaging agents and sensors. For the encapsulation, one or more lanthanides was mixed with an aqueous or alcoholic solution of wsCNP in the open form and the resultant solution was vacuum dried at −37° C. The mass was washed with cold water to remove free lanthanide not encapsulated within the wsCNP to produce a GO-lanthanide composite.

Example 3 wsCNP Crosses Blood Brain Barrier in Transgenic Mouse

An experiment was performed to investigate whether wsCNP are able to cross the blood brain barrier (BBB). In the experiment, wsCNP produced according to the methods described in the '507 patent was injected into the tail of transgenic mice. The transgenic mice had pericyte dysfunction, associated with neurodegenerative diseases. Pericyte function is an important component of the neurovascular unit that contributes to the integrity of the BBB. BBB disruption or disintegrity in the affected brain can allow for passive diffusion. By intravenous administration of the wsCNP to a mouse, it was demonstrated that the fluorescent wsCNP smoothly crossed the BBB into the brain of transgenic FVBN mice.

Cerebral autosomal dominant arteriopathy with subcortical infarcts and leukoencephalopathy (CADASIL), one of the most common small vessel diseases, is a major contributor of vascular dementia in humans. Primarily, it is known to be caused by Notch3 mutation. Recently, ultra-structural changes in pericytes have been shown in CADASIL. Therefore, BBB integrity was assessed in a murine model of CADASIL (R169C; Tg88 by overexpression of mutated transgene) using wsCNP. The inherent properties of wsCNP make it ideal for delivery of therapeutic and/or imaging agents. For example, properties including low toxicity, amphipathic properties allowing for permeability, fluorescence in the blue, green, and red spectrums, and suitable dimensions and properties for loading and release of imaging and/or therapeutic molecules. The properties of the wsCNP include permeability through blood vessels, allowing for passage through hydrophilic as well as liphophilic routes even without pegylation.

Using intra-arterial injection of wsCNP, the brain of a mouse was imaged in-vivo in real time by constant monitoring for at least 30 minutes after injection of the wsCNP. The elasticity of the blood vessel and the gradual enhancement in florescence due to the wsCNP clearly demonstrated the passage of the wsCNO along the blood vessel and into the brain (data not shown). The mouse was then sacrificed and a brain slice was imaged by fluorescence microscopy using two color channels to demonstrate the presence of wsCNP in the brain cortex (the brain vessels were labeled with lectin by intravenous injection to demarcate the fluorescence due to wsCNP in brain vessels of the cortex (data not shown)). It was noted that such easy passage of wsCNP across BBB into the brain may not take place in healthy mice, suggesting the utility of this process for treatment of brain disorders involving vascular degeneration. It was inferred that the passage of wsCNP across the BBB was only facilitated in the case of the noted vascular defect.

In addition, adult C57B6 mice (6 months old) were injected into the brain with a small number of mouse GBM cells ("orthotopic allograft"). After tumor establishment (two weeks), small amounts of GFP+ cells were introduced into the mouse brain. The mice were then injected into the blood stream via the tail vein with wsCNP (concentration 1 mg/ml in water, 10 µl per gm body weight of each of the mice) and 3 separate time period exposures were recorded (4, 12, and 24 hours). The brain was fixed, cut and imaged as single slice under confocal microscope and imaged. FIG. 9 illustrates images of the GFP+ cells (tumor cells), blood vessels, and the wsCNP as indicated with arrows. The image shows the ability of the wsCNP to cross the BBB.

Experimental Section

The wsCNP was synthesised as reported. A 1.0 mg/mL concentration of wsCNO was made and 10.0 µl per gm of the body weight of mice was administered by intravenous tail vein injection with a dose of 200 µl for 20 g mice or 250 µl for 25 g mice. Six to 8 month old transgenic FVBN mice were used (R169C; Tg88 by over expression of mutated transgene that were 23 to 26 g) obtained from either Charles River (Kisslegg, Germany) or Jackson Laboratories (Bicester, UK). The animals had free access to tap water and pellet food. Mice within one experiment were housed individually throughout the experiment. All animal experiments were conducted in accordance with institutional guidelines and approved by the government of Upper Bavaria. Animals were anesthetized by an intra-peritoneal injection of medetomidine (0.5 mg/kg, DOMITOR), fentanyl (0.05 mg/kg), and midazolam (5 mg/kg, DORMICUM). Following induction, the mice were endotracheally intubated and ventilated using a volume-controlled ventilator. Body temperature was maintained at 37±0.1° C. with a feedback-controlled heating pad. Body temperature and end-tidal $CO_2$ were monitored continuously. Subsequently, the animals were immobilized in a stereotactic frame, and one square (2 mm×2 mm) cranial window was prepared over the fronto-parietal cortex of the right hemisphere. The window was prepared under continuous cooling with saline, the dura mater was carefully removed, and a custom-made cover glass (Schott Displayglas, Jena, Germany) was inserted and affixed with dental cement (Cyano Veneer, Hager & Werken, Duisburg, Germany). For maintenance of physiological conditions, the exposed dura mater was continuously irrigated with warm isotonic saline solution (0.9% NaCl at 37° C.). The cerebral micro vessels were then investigated in this area. The animals were placed on a computer-controlled microscope stage for repeated analyses of the same vessels. Visualization of the microvessel was performed using an upright epifluorescence microscope AxioscopeVario (Zeiss) with COLIBRI for detection of fluorescent wsCNO in FITC channel. The vessels were visualized with a saltwater immersion objective.

After two baseline recordings of selected cerebral arterioles and venules in the window, the animals were injected with wsCNP (n=4 mice per group) by tail vein injection both in transgenic and control mice. The previously observed vessels were constantly being monitored up to 30 min after injection. At the end of each experiment, the animals were sacrificed by transcardiac perfusion with 4% PFA. Image and video acquisition was done using a Zeiss AxioCam MRm monochrome camera equipped with the microscope and COLIBRI illumination system. The system was controlled with the Zeiss AxioVision software tools. The video acquisition was made using Fast acquisition sub tool in the multidimensional imaging tool of the software in the FITC channel.

Adult C57B6 mice (6 months old) were injected into the brain with a small number of mouse GBM cells ("orthotopic allograft"). After tumor establishment (two weeks), small amounts of GFP+ cells were introduced into the mouse brain. The wsCNP (concentration 1 mg/ml in water), 10 µl per gm body weight of each of the mice with 3 time period exposure—4-12-24 hours were injected into the blood stream via the tail vein. The brain was fixed, cut and imaged as single slice under confocal microscope and imaged where color distinction in tumor GFP+ cells were green, wsCNO was red, vacuolar marker antibody was blue and blood channel was white (images are shown herein in black and white).

Example 4

Water Soluble CNP Containing Bivalent Metal for Targeted Delivery to the Brain

In these experiments, manganese (Mn) or another divalent metal was incorporated into the wsCNP to allow for targeting of the wsCNP to the brain. In this manner, the wsCNP was shown to utilize the capacity of Mn to be taken up by nerve terminals via the bivalent metal transporter of the olfactory nerves where it can be further transported to the entire brain. Thus, wsCNP can be loaded with a therapeutic agent and/or an imaging agent and also contain incorporated divalent metal to advantage of the metal transporter to target delivery of the wsCNP contents to the brain of a subject.

Manganese acetylacetonate $(Mn(acac)_3)$ was incorporated into the GO produced according to the method in Example 1 by mixing the GO and $Mn(acac)_3$ in ethanol. The solution was vacuum dried at −37° C., resulting in a solid powder form. The powdered mass was washed with distilled water to remove any excess $Mn(acac)_3$. FIGS. 10A-10D show electronic spectra of the: A) Untreated GO in ethanol; B) $Mn(acac)_3$ in ethanol; C) GO containing $Mn(acac)_3$; and D) Simulated spectra of combined GO and $Mn(acac)_3$. The spectral data show that the Mn remains associated with the GO at the pH 6.5. The experiment shows that a bivalent metal (such as Mn) can be incorporated into the wsCNP to take advantage of the metal transporter to target delivery of the wsCNP to the brain.

In another experiment, manganese acetylacetonate (Mn(acac)$_3$) was incorporated into a wsCNP and a therapeutic agent and/or imaging agent was encapsulated within the wsCNP according to the following procedure. A Mn salt and a therapeutic agent and/or imaging agent for encapsulation are added together in a solution (or two solvents were mixed where both the therapeutic agent and/or imaging agent and the Mn salt were soluble, for example, manganese acetate in alcohol and the therapeutic agent in dichloromethane). In one example, the imaging agent was any of the lanthanides. The ratio of the therapeutic agent and/or imaging agent and Mn can vary depending on the required concentration of each. To the above solution, wsCNP in open form in aqueous or alcoholic solution was added. The solution was vacuum dried at −37° C., resulting in a solid powder form that has the incorporated Mn and encapsulated therapeutic agent and/or imaging molecule. The powdered mass was washed with distilled water to remove any excess Mn salt and was then washed with a solvent (such as, for example, dichloromethane) to remove therapeutic agent that was not encapsulated. The washed powdered form (free from excess Mn salt and therapeutic agent/imaging agent) has potential for administration by nasal insufflation. This experiment is an example showing that a bivalent metal such as Mn can be incorporated into the wsCNP to take advantage of the metal transporter to target delivery of the wsCNP (and its contents such as a therapeutic agent and/or an imaging molecule) to the brain as nasal insufflations.

Any patents or publications mentioned in this specification are indicative of the levels of those skilled in the art to which the present disclosure pertains. These patents and publications are herein incorporated by reference in their entirety to the same extent as if each individual publication was specifically and individually indicated to be incorporated by reference.

One skilled in the art will readily appreciate that the present disclosure is well adapted to carry out the objects and obtain the ends and advantages mentioned, as well as those inherent therein. The present Examples along with the methods described herein are presently representative of preferred embodiments, are exemplary, and are not intended as limitations on the scope of the invention. Changes therein and other uses will occur to those skilled in the art which are encompassed within the spirit of the present disclosure as defined by the scope of the claims.

Example 5

Cdot or GO Nanoparticles Reach Neurons of Healthy or Tumor-Infected Mice cDot Brain Distribution in a Glioblastoma Mouse Model Glioblastoma is the most devastating form of brain cancer with a median survival of 15 months. The only FDA-approved therapy after tumor resection (treatment with radiation concomitant with the chemotherapeutic temozolimide) invariably fails. Most FDA-approved drugs to treat cancer do not pass the blood-brain barrier, thus cannot be tested as experimental drug for glioblastoma. Nanoparticles are a promising tool for drug delivery but has not been adapted to be utilized for neurological disease yet. The example below tests whether cDots could pass the blood brain barrier as the first step to design a novel drug delivery system to the deep brain tissue.

Mouse glioblastoma cells (10,000) were orthotopically injected in the mid-brain (diencephalon) of anesthetized wildtype mice (strain C57B6) under aseptic conditions. The mice were kept in their home cage for 2 weeks to allow glioblastoma growth and incorporation into the surrounding brain tissue. cDots were resuspended at 1 mg/ml and 3 mg/ml in sterile saline, and 100 ul per mouse were injected into the tail vein. 6, 12 or 24 hours after cDot injection, mice were deeply anesthetized and intra-cardial perfused with fixative (4% para-formaldehyde). cDots did not display overt toxicity since mice were asymptomatic during the period of the experiment and the liver appeared normal. Brains were subsequently cut into 50 um sagittal sections, and sections with GFP-expressing tumor mass were selected for immunofluorescence staining. cDots were found distributed throughout the tumor mass, both co-localizing with blood vessels and the surrounding tissue, indicating that cDots had left the vascular system and diffused into the surrounding brain tissue. cDots were also found throughout normal brain tissue, both in proximity and far distant from the tumor mass, demonstrating the general ability of cDots to penetrate the blood brain barrier. We did not find a difference in cDots density in normal brain tissue when comparing 6 and 24 hrs time points, and low and high cDot injection concentrations, suggesting that cDots reach their maximal tissue concentration within 6 hrs, which cannot be further increased by increased cDot plasma levels. The cDot density in normal brain tissue was higher than inside the tumor mass, which may be due to the poor vascularization of tumors or reduced diffusion rates into the tumor (e.g. caused by free carboxy groups on the surface of the cDots and an acidic tumor microenvironment).

The cell types cDots were targeting in the brain were then identified. In the normal cerebral cortex, the majority of cDots were found closely associated with NeuN$^+$ pyramidal neurons. It appeared that cDots also have the ability to enter the cytoplasm of neurons. Similarly, neurons in proximity of the tumor mass were decorated with cDots. Some tumor cells were decorated with cDots or appeared to have incorporated cDots. In contrast, there was no evidence that cDots associated with healthy astroglial cells (the likely cell of origin for glioblatomas) in the cerebral cortex. Microglia (part of the immune response in brain tissue) phagocytized cDots both in normal brain tissue and in the tumor mass. cDots decorated neurons and microglial at comparable rates.

Thus, in summary, cDots were injected in the bloodstream of a mouse model for glioblastoma, the most devastating form of brain cancer. Mice were sacrificed after 6-24 hrs and brain distribution of cDots was assessed by confocal microscopy of fixed brain sections. cDots readily passed the blood brain barrier and were distributed throughout normal and tumor tissue. Cellular analysis revealed that cDots were primarily associated with neurons but not with glial cells, and that the cDot density was lower inside the glioblastoma compared to normal brain tissue.

Excreta samples were taken every 24 hours from a mouse that was injected with Cdot or GO nanoparticles via the tail vein. Samples were collected on cotton swabs, processed and analyzed under a fluorescent microscope in the red color range. Though the nanoparticles fluoresce in blue (around 475 nm), green (around 510 nm) and red (around 650 nm) regions of the spectrum, for this study the focus was on the red region as common bio molecules available naturally do not fluoresce in this region.

Figure 11:
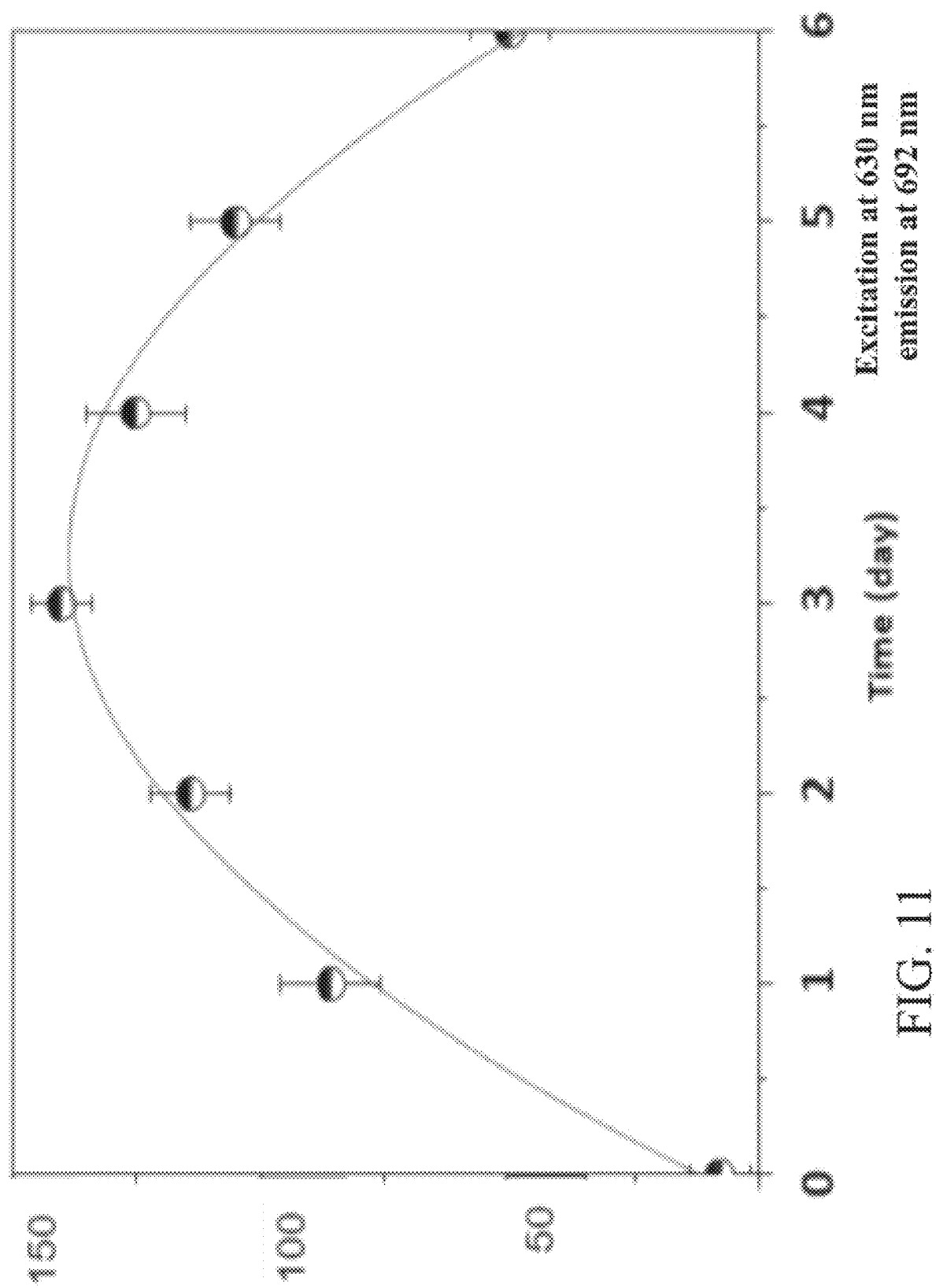
FIG. 11 is a line graph showing nanoparticle excretion over time.

The intensity of the fluorescence is related to Cdot or GO. Accordingly, the length of time it took the nanoparticles to excrete was studied. The intensity of the fluorescence was low for day 1 and it steadily increased to suggest the rate of excretion increased on day 2 with highest intensity observed at day 3. The intensity started to decrease from day 4 and was not visible after day 5, indicating the nanoparticles were excreted from the system after 5 days, as shown in FIG. 11 (showing fluorescence intensity (a.u.) versus time (days). The cdot or GO nanoparticles are nontoxic (soluble and readily excreted from the body) and the $LD_{50}$ of GO or Cdot was found to be 1098 mg/kg body weight.

Figures 12E, 12F, 12G:
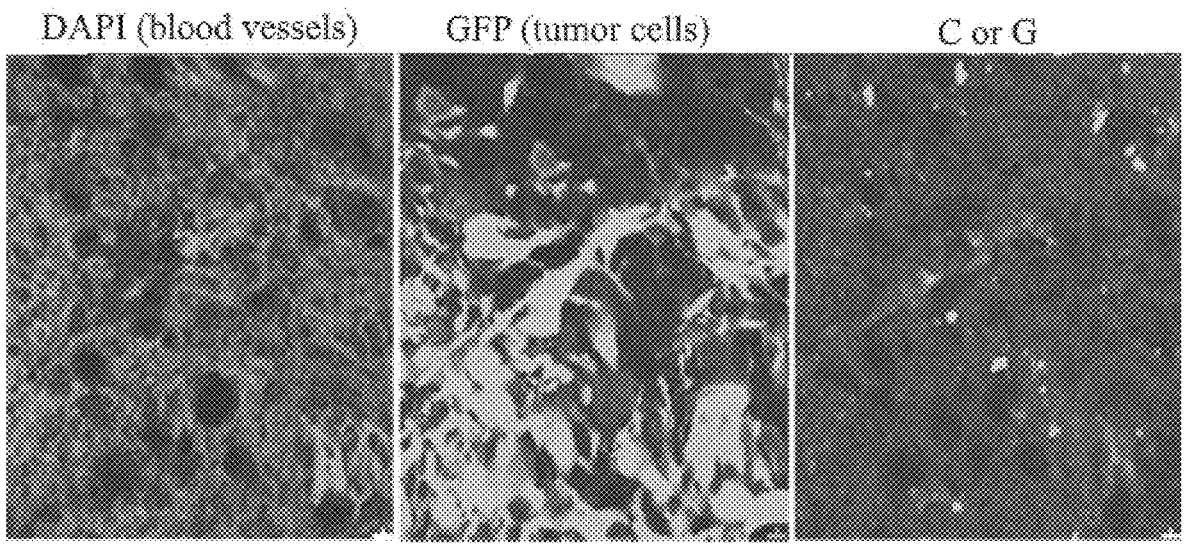
Figures 12H, 12I:
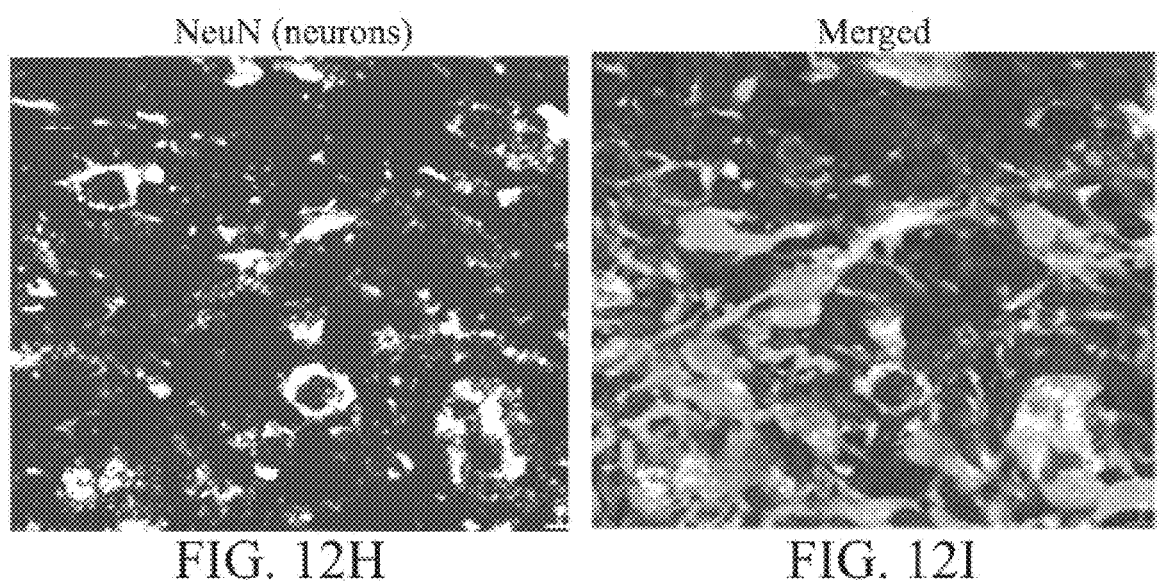

FIGS. 12A-12D indicate fluorescent microscope images (4 hour post Cdot or GO injection) for normal mice and FIG. 12E-12I indicate fluorescent microscope images (4 hour post Cdot or GO injection) for tumor-infected mice. FIGS. 12A and 12E show blood vessels. FIGS. 12B and 12G show Cdot and GO as dots. FIG. 12F shows tumor cells conjugated or tagged with GFP. Neurons are shown in FIGS. 12C and 12H. Brain tissue in normal mice in merged image (12D) show C/G as dots present near neuron cells.

It can therefore be determined that cDots may be a promising carrier for targeting drugs to neurons throughout the brain. To a lesser extent, cDots could be used for glioblastoma treatment. The incorporation of molecular targeting ability into the cDot surface may be necessary for increased cell type or tumor selectivity.

Materials and Methods

Mice.

C57B6 mice ("Black 6 mice") were orthotopically injected into the diencephalon (located central inside the brain) with GFP-tagged mouse glioblastoma cells. On day 14, after a glioblastoma had formed, 100 ul of cDots suspended in sterile saline was injected into the tail vein at 1 mg/ml and 3 mg/ml concentration. After 6, 12 or 24 hrs mice were deeply anesthetized and fixed by intra-cardial infusion of 4% para-formaldehyde. All procedures had been approved by the UNC Institutional Animal Use and Care Committee.

Tissue Processing and Imaging.

Brains were sagitally cut into 50 um stick section with a Leica vibratome, followed by processing for immunofluorescence staining. Primary antibodies were used as molecular markers to identify neurons (NeuN), astroglia (BLBP), microglia (Iba1) or endothelial cells enclosing blood vessels (CD31). The molecular markers were detected by CF405 or CF647 fluorescent dye-conjugated secondary antibodies. Cell nuclei were counterstained with DAPI. Mounted brain sections were imaged with a ZEISS LSM780 confocal microscope. GFP was detected on the green channel (excitation 488 nm, emission band 500-550 nm), cDots on the red channel (excitation 561 nm, emission band 570-630 nm), DAPI and CF405 dyes on the blue channel (excitation 405 nm, emission band 420-470 nm), and CF647 dyes on the far-red channel (excitation 647 nm, emission band 650-720 nm). Images were exported as TIF files with Zeiss ZEN 2012 software.

REFERENCES

1. Hummers W S, Offeman R E. Preparation of Graphitic Oxide. *J Am Chem Soc* 1958, 80: 1339-1339.
2. Boehm H P, Scholz W. Der "Verpuffungspunkt" des Graphitoxids. *Z Anorg Allg Chem* 1965, 335: 74-79.
3. Marcano D C, Kosynkin D V, Berlin J M, Sinitskii A, Sun Z, Slesarev A, et al. Improved Synthesis of Graphene Oxide. *ACS Nano* 2010, 4: 4806-4814.
4. Ye R, Xiang C, Lin J, Peng Z, Huang K, Yan Z, et al. Coal as an abundant source of graphene quantum dots. *Nat Commun* 2013, 4.
5. Ministry of Coal, Government of India, Coal Grades. 2014 24 Sep. 2014 [cited 2015 23 Apr. 2015] Available from: http://www.coal.nic.in/content/coal-grades
6. Guerrero-Contreras J, Caballero-Briones F. Graphene oxide powders with different oxidation degree, prepared by synthesis variations of the Hummers method. *Mater Chem Phys* 2015, 153: 209-220.
7. Ethirajan M, Chen Y, Joshi P, Pandey R K. The role of porphyrin chemistry in tumor imaging and photodynamic therapy. *Chem Soc Rev* 2011, 40: 340-362.
8. Tsuda A, Nagamine Y, Watanabe R, Nagatani Y, Ishii N, Aida T. Spectroscopic visualization of sound-induced liquid vibrations using a supramolecular nanofibre. *Nat Chem* 2010, 2: 977-983.
9. Shen H, Zhang L, Liu M, Zhang Z. Biomedical Applications of Graphene. *Theranostics* 2012, 2: 283-294.
10. Heydorn W E. Donepezil (D Z): a new acetylcholinesterase inhibitor. Review of its pharmacology, pharmacokinetics, and utility in the treatment of Alzheimer's disease. *Expert opinion on investigational drugs* 1997, 6: 1527-1535.

What is claimed is:

1. A method for making graphene oxide nanoparticles, the method comprising:
   a) treating a material comprising one or a combination of wood charcoal, low grade coal, or carbonized plant biomass with a dilute alkali solution to form a mixture of components including insoluble material and a second solution;
   b) separating the second solution from the insoluble material; and
   c) neutralizing the second solution with an acid to form a precipitate upon standing; and
   d) separating the precipitate from the neutralized second solution;

wherein the precipitate comprises graphene oxide nanoparticles having a plurality of sheets ranging in size from about 40 nm to 200 nm in the open form.

2. The method of claim 1, wherein the dilute alkali solution is 10% sodium hydroxide.

3. The method of claim 1, wherein the acid comprises hydrochloric acid.

4. The method of claim 1, wherein the treating in dilute alkali solution is performed at a temperature ranging from about 25° C. to 40° C.

5. The method of claim 4, wherein the temperature is about 40° C.

6. The method of claim 1, wherein the treating with dilute alkali solution is performed until the solution turns a yellow-brown color.

7. The method of claim 1, wherein the wood charcoal, low grade coal or carbonized biomass is in a powdered form.

8. The method of claim 1 wherein the wood charcoal, low grade coal or carbonized biomass is washed with an organic solvent prior to treatment with the dilute alkali solution to remove aromatic hydrocarbons and soluble organic compounds.

9. The method of claim 1, further comprising washing the precipitate with cold water.

* * * * *